United States Patent
Liu et al.

(10) Patent No.: US 12,526,810 B2
(45) Date of Patent: Jan. 13, 2026

(54) ELECTRONIC DEVICE, WIRELESS COMMUNICATION METHOD AND COMPUTER-READABLE STORAGE MEDIUM

(71) Applicant: Sony Group Corporation, Tokyo (JP)

(72) Inventors: Min Liu, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 467 days.

(21) Appl. No.: 18/014,180

(22) PCT Filed: Aug. 12, 2021

(86) PCT No.: PCT/CN2021/112195
§ 371 (c)(1),
(2) Date: Jan. 3, 2023

(87) PCT Pub. No.: WO2022/037467
PCT Pub. Date: Feb. 24, 2022

(65) Prior Publication Data
US 2023/0276452 A1 Aug. 31, 2023

(30) Foreign Application Priority Data
Aug. 19, 2020 (CN) .......................... 202010836807.4

(51) Int. Cl.
*H04W 72/23* (2023.01)
*H04W 72/044* (2023.01)
(Continued)

(52) U.S. Cl.
CPC ....... *H04W 72/23* (2023.01); *H04W 72/0453* (2013.01); *H04W 72/046* (2013.01); *H04W 72/21* (2023.01)

(58) Field of Classification Search
CPC ............. H04W 72/23; H04W 72/0453; H04W 72/046; H04W 72/21; H04B 7/0695; H04L 5/0023
See application file for complete search history.

(56) References Cited

U.S. PATENT DOCUMENTS 11,722,183 B2 * 8/2023 Cao ...................... H04B 7/0608
370/329
12,256,400 B2 * 3/2025 Islam .................... H04L 1/1896
(Continued)

FOREIGN PATENT DOCUMENTS

CN 108024365 A 5/2018
CN 110072285 A 7/2019
(Continued)

OTHER PUBLICATIONS

International Search Report and Written Opinion mailed on Oct. 26, 2021, received for PCT Application PCT/CN2021/112195, filed on Aug. 12, 2021, 9 pages including English Translation.
(Continued)

*Primary Examiner* — Brian T O Connor
(74) *Attorney, Agent, or Firm* — XSENSUS LLP

(57) ABSTRACT

The present disclosure relates to an electronic device, a wireless communication method and a computer-readable storage medium. The electronic device of the present disclosure comprises a processing circuit, which is configured to: generate first downlink control signaling, wherein the first downlink control signaling comprises first frequency-domain indication information and first beam indication information, and a frequency-domain resource indicated by the first frequency-domain indication information is the same as a frequency-domain resource corresponding to a beam indicated by the first beam indication information; and send the first downlink control signaling to a user equipment. By means of the electronic device, the wireless (Continued)

communication method and the computer-readable storage medium according to the present disclosure, it is possible to improve a process for indicating a beam and a frequency-domain resource where the beam and the frequency-domain resource are bound.

3 Claims, 12 Drawing Sheets

(51) Int. Cl.
  *H04W 72/0453* (2023.01)
  *H04W 72/21* (2023.01)

(56) References Cited

U.S. PATENT DOCUMENTS

| 12,308,902 | B2* | 5/2025 | Cao | H04B 7/0608 |
|---|---|---|---|---|
| 2019/0199496 | A1 | 6/2019 | Qin | |
| 2020/0052782 | A1* | 2/2020 | Wang | H04W 76/27 |
| 2021/0091900 | A1* | 3/2021 | Zhang | H04L 5/0044 |
| 2021/0136808 | A1* | 5/2021 | Yang | H04L 5/001 |
| 2021/0159966 | A1* | 5/2021 | Xi | H04B 7/0695 |
| 2023/0119810 | A1* | 4/2023 | Kim | H04L 5/0053 370/329 |
| 2023/0328785 | A1* | 10/2023 | Zhang | H04L 5/0023 370/329 |
| 2025/0015865 | A1* | 1/2025 | Svedman | H04B 7/088 |

FOREIGN PATENT DOCUMENTS

| CN | 110519843 A | 11/2019 |
|---|---|---|
| CN | 110545138 A | 12/2019 |
| CN | 110719631 A | 1/2020 |
| WO | 2019/195528 A1 | 10/2019 |
| WO | 2020/012662 A1 | 1/2020 |
| WO | 2020/033675 A1 | 2/2020 |

OTHER PUBLICATIONS

Mediatek Inc., "Other Aspects of NR-NTN", 3GPP TSG RAN WG1 Meeting #102e, R1-2005498, Aug. 24-28, 2020, 13 pages.
Sony, "Discussion on beam management and BWP operation for NTN", 3GPP TSG RAN WG1 Meeting # 102-e, R1-2005576, Aug. 17-28, 2020, pp. 1-3.
Thales, "Other RAN1 aspects for NR NTN", 3GPP TSG-RAN WG1 #102-e, R1-2006678, Aug. 17-28, 2020, pp. 1-23.

* cited by examiner

ELECTRONIC DEVICE, WIRELESS COMMUNICATION METHOD AND COMPUTER-READABLE STORAGE MEDIUM

CROSS-REFERENCE TO RELATED APPLICATIONS

This application is based on PCT filing PCT/CN2021/112195, filed Aug. 12, 2021, which claims the priority to Chinese Patent Application No. 202010836807.4 titled "ELECTRONIC DEVICE, WIRELESS COMMUNICATION METHOD AND COMPUTER-READABLE STORAGE MEDIUM", filed on Aug. 19, 2020 with the China National Intellectual Property Administration (CNIPA), the entire contents of each of which is incorporated herein by reference in its entirety.

FIELD

Embodiments of the present disclosure generally relate to the field of wireless communications, and in particular to an electronic device, a wireless communication method, and a computer-readable storage medium. More particularly, the present disclosure relates to an electronic device as a network side device in a wireless communication system, an electronic device as a user equipment in a wireless communication system, a wireless communication method performed by a network side device in a wireless communication system, a wireless communication method performed by a user equipment in a wireless communication system and a computer-readable storage medium.

BACKGROUND

In a wireless communication system including Non-terrestrial network (NTN), a satellite device may generate multiple beams. Furthermore, one Physical Cell ID (PCI) may correspond to multiple beams. In this way, cell switching is not required when switching beam, to avoid frequent synchronization, RRC reconnection and other operations.

In addition, beams may have a binding relationship with frequency domain resources. The frequency domain resources herein include but are not limited to Bandwidth Part (BWP). In other words, a specific beam may only be transmitted on a BWP with a binding relationship with the beam.

Therefore, in the wireless communication system including NTN, in a case that frequency domain resources are bound to beams, how a network side device indicates a frequency domain resource and a beam for uplink transmission or downlink transmission to the user equipment is a technical problem to be solved. In addition, if only one downlink BWP is activated for the user equipment, since the BWP is bound to a beam, it is necessary that downlink control information and downlink data information use a same beam. Similarly, if only one uplink BWP is activated for the user equipment, since the BWP is bound to a beam, it is necessary that uplink control information and uplink data information use a same beam. Therefore, in this case, how to ensure that the beam of the uplink control information is the same as the beam of the uplink data information, and how to ensure that a beam of the downlink control information is the same as a beam of the downlink data information are also technical problems to be solved.

Therefore, it is required to provide a technical solution to solve at least one of the above technical problems.

SUMMARY

This summary section provides a general summary of the present disclosure, rather than a comprehensive disclosure of full scope or features of the present disclosure.

An object of the present disclosure is to provide an electronic device, a wireless communication method, and a computer-readable storage medium, to improve a process of indicating beams and frequency domain resources in a case that the beams are bound to the frequency domain resources.

An electronic device is provided according to an aspect of the present disclosure. The electronic device includes a processing circuit configured to: generate a first downlink control signaling, where the first downlink control signaling includes first frequency domain indication information and first beam indication information, and a frequency domain resource indicated by the first frequency domain indication information is the same as a frequency domain resource corresponding to a beam indicated by the first beam indication information; and transmit the first downlink control signaling to user equipment.

An electronic device is provided according to another aspect of the present disclosure. The electronic device includes a processing circuit configured to: receive a first downlink control signaling, where the first downlink control signaling includes first frequency domain indication information and first beam indication information; and in a case that a frequency domain resource indicated by the first frequency domain indication information is the same as a frequency domain resource corresponding to a beam indicated by the first beam indication information, receive downlink information or transmit uplink information on the frequency domain resource according to the beam.

A wireless communication method is provided according to another aspect of the present disclosure. The wireless communication method includes generating a first downlink control signaling, where the first downlink control signaling includes first frequency domain indication information and first beam indication information, and a frequency domain resource indicated by the first frequency domain indication information is the same as a frequency domain resource corresponding to a beam indicated by the first beam indication information; and transmitting the first downlink control signaling to user equipment.

A wireless communication method is provided according to another aspect of the present disclosure. The wireless communication method includes receiving a first downlink control signaling, where the first downlink control signaling includes first frequency domain indication information and first beam indication information; and in a case that a frequency domain resource indicated by the first frequency domain indication information is the same as a frequency domain resource corresponding to a beam indicated by the first beam indication information, receiving downlink information or transmitting uplink information according to the beam on the frequency domain resource.

A computer readable storage medium is provided according to another aspect of the present disclosure. The computer readable storage medium includes executable computer instructions that, when executed by a computer, cause the computer to perform the wireless communication method according to the present disclosure.

A computer program is provided according to another aspect of the present disclosure. The computer program, when executed by a computer, causes the computer to perform the wireless communication method according to the present disclosure.

With the electronic device, the wireless communication method and the computer readable storage medium according to the present disclosure, a downlink control signaling includes frequency domain indication information and beam indication information, and a frequency domain resource indicated by the frequency domain indication information is the same as a frequency domain resource corresponding to a beam indicated by the beam indication information. In this way, beams and frequency domain resources may be correctly indicated in a case that the beams are bound to the frequency domain resources, to prevent a case in which the user equipment could not perform reception or transmission normally due to the frequency domain resource indicated by the frequency domain indication information being different from the frequency domain resource corresponding to the beam indicated by the beam indication information.

From the description herein, a further applicable area becomes apparent. The description and specific examples in the summary are only illustrative and are not intended to limit the scope of the present disclosure.

BRIEF DESCRIPTION OF THE DRAWINGS

The drawings are only used for illustrating the selected embodiments rather than all possible implementations, and are not intended to limit the scope of the present disclosure. In the drawings.

Figure 1:
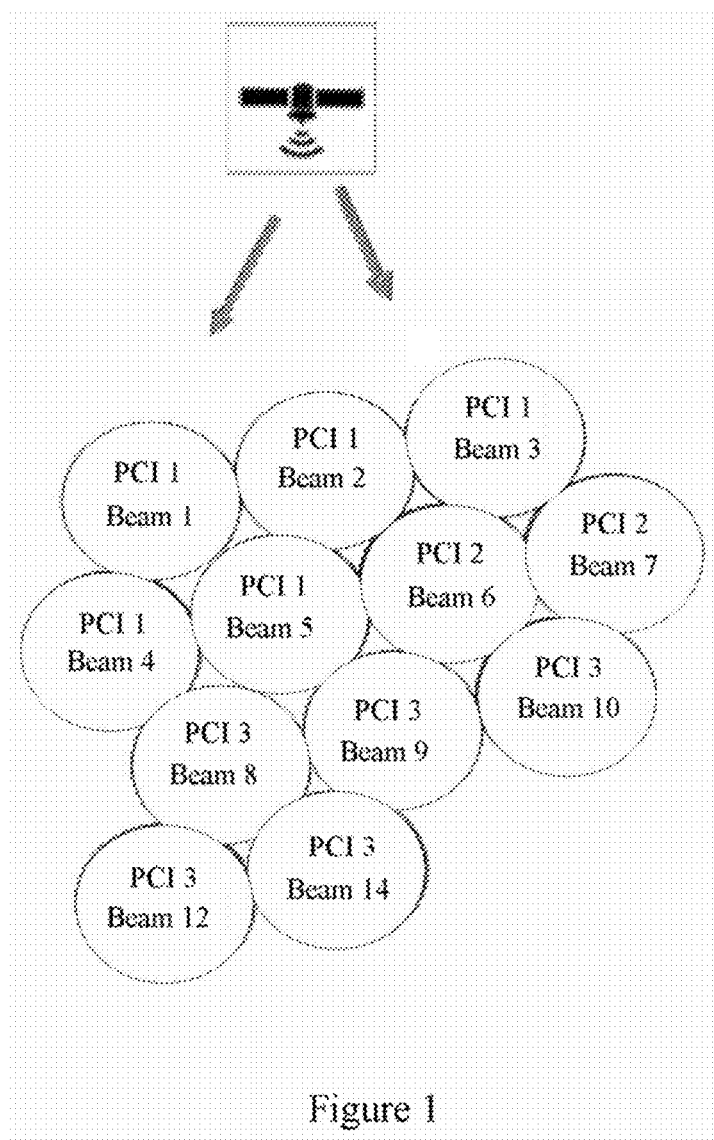
FIG. 1 is a schematic diagram showing a scenario where each cell is configured with multiple beams according to an embodiment of the present disclosure.

Although various modification and alternations are easily made to the present disclosure, specific embodiments are shown in the drawings as examples, and are described in detail here. It should be understood that description for the specific embodiments is not intended to limit the present disclosure to a specific form as disclosed. Instead, the present disclosure aims to cover all modifications, equivalents and alternations within the spirit and scope of the present disclosure. It should be noted that a corresponding reference numerals indicate corresponding parts through the drawings.

DETAILED DESCRIPTION

Examples of the present disclosure are fully disclosed with reference to the drawings. The following description is merely exemplary and is not intended to limit the present disclosure and an application or use thereof.

Exemplary embodiments are provided, so that the present disclosure becomes thorough and fully convey the scope thereof to those skilled in the art. Numerous specific details such as examples of specific components, devices and methods are set forth to provide detailed understanding of embodiments of the present disclosure. It is apparent to those skilled in the art that, exemplary embodiments may be implemented in many different forms without the specific details, and the embodiments should not be construed as limiting the scope of the present disclosure. In some exemplary embodiments, well-known processes, structures and technologies are not described in detail.

Description is made in the following order:
1. Description of scenario;
2. Configuration examples of network side device;
3. Configuration examples of user equipment;
4. Method embodiments; and
5. Application examples.

1. DESCRIPTION OF SCENARIO

FIG. 1 is a schematic diagram showing a scenario where each cell is configured with multiple beams according to an embodiment of the present disclosure. As shown in FIG. 1, each PCI may correspond to multiple beams. For example, PCI1 may correspond to beam 1, beam 2, beam 3, beam 4 and beam 5, PCI2 may correspond to beam 6 and beam 7, and PCI3 may correspond to beam 8, beam 9, beam 10, beam 12 and beam 14.

Figure 2:
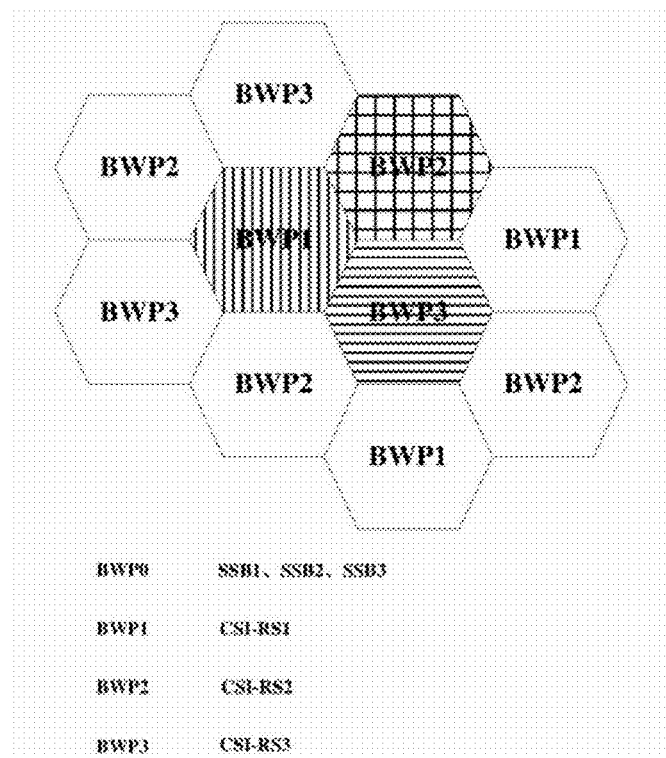
FIG. 2 is a schematic diagram showing a scenario where beams are bound to frequency domain resources according to an embodiment of the present disclosure.

FIG. 2 is a schematic diagram showing a scenario where beams are bound to frequency domain resources according to an embodiment of the present disclosure. FIG. 2 shows coverage of an NTN cell. The coverage of the NTN cell is geographically divided into multiple regions. Here, although FIG. 2 shows an example where a shape of each of the regions is hexagonal and the all regions have a same size, the present disclosure is not limited thereto. In addition, the NTN cell adopts frequency reuse technology, and a frequency reuse factor is 3. In other words, frequency domain resources are divided into BWP1, BWP2 and BWP3. Adjacent regions use different BWPs to avoid interference.

As well know, a transmission beam of a network side device may be represented by a downlink reference signal identification. A downlink reference signal includes but is not limited to Synchronization Signal Block (SSB) and Channel State Information-Reference Signal (CSI-RS). For BWP used for initial access (also referred to as BWP0), all SSBs may be transmitted on the BWP0. That is, the user equipment performs synchronization by detecting all SSBs on BWP0. As shown in FIG. 2, beams represented by SSB1, SSB2 and SSB3 may be transmitted on BWP0. BWPs other than BWP0 have a correspondence (also referred to as a binding relationship) with beams represented by CSI-RS. Specifically, for a specific region, BWP has a one-to-one correspondence with a downlink transmission beam represented by CSI-RS.

As shown in FIG. 2, in BWP1 shown in a vertical strip-shaped region, BWP1 has a binding relationship with CSI-RS1. That is, for a user equipment in the vertical strip-shaped region, the network side device transmits downlink information to the user equipment by using BWP1 and a downlink transmission beam represented by CSI-RS1. As another example, in BWP3 shown in a horizontal strip-shaped region, BWP3 has a binding relationship with CSI-RS3. That is, for a user equipment in the horizontal strip-shaped region, the network side device transmits downlink information to the user equipment by using BWP3 and a downlink transmission beam represented by CSI-RS3. For another example, in BWP2 shown in a grid region, BWP2 has a binding relationship with CSI-RS2. That is, for a user equipment in the grid region, the network side device transmits downlink information to the user equipment by using BWP2 and a downlink transmission beam represented by CSI-RS2.

It should be noted that the one-to-one correspondence between BWP and CSI-RS is only set for a specific region. For example, in BWP1 in a blank region in FIG. 2, another beam, which is not adjacent to a beam represented by CSI-RS1, than the beam represented by CSI-RS1 may be used.

As described above, FIG. 2 illustrates a scenario where frequency domain resources are bound to downlink transmission beams by taking the frequency domain resources as BWP, as an example. In uplink, the frequency domain resources may also be bound to beams. For example, BWP for uplink may be bound to an uplink transmission beam of the user equipment. That is, an uplink BWP of the user equipment has a one-to-one correspondence with the uplink transmission beam. Similarly, an uplink beam may be represented by using an uplink reference signal identification. The uplink reference signal includes but is not limited to Sounding Reference Signal (SRS).

In addition, FIG. 2 shows a scenario where a frequency reuse factor is 3, the frequency reuse factor is not limited in the present disclosure.

For such a scenario, an electronic device in a wireless communication system, a wireless communication method performed by an electronic device in a wireless communication system, and a computer-readable storage medium are provided according to the present disclosure, to improve a process of indicating beams and frequency domain resources in a case that the beams are bound to the frequency domain resources.

The wireless communication system according to the present disclosure may be a 5G New Radio (NR) communication system. Further, the wireless communication system according to the present disclosure may include NTN. In an embodiment, the wireless communication system according to the present disclosure may further include a Terrestrial network (TN).

The network side device according to the present disclosure may be any type of base station device, for example, may be an eNB or a gNB (a base station in a 5th generation communication system). In addition, the network side device according to the present disclosure may be located on the ground or on a satellite device. In other words, the satellite device may be used to provide services for a user equipment. In a case that the satellite device providing services for the user equipment is a transparent satellite device, the network side device may be located on the ground. In a case that the satellite device providing services for the user equipment is a non-transparent satellite device, the network side device may be located on the satellite device.

The user equipment according to the present disclosure may be a mobile terminal (such as a smartphone, a tablet personal computer (PC), a notebook PC, a portable game terminal, a portable/dongle mobile router and a digital camera) or a vehicle terminal (such as a car navigation device). The user equipment may also be implemented as a terminal performing machine to machine (M2M) communication (also referred to as a machine-type communication (MTC) terminal). In addition, the user equipment may be a wireless communication module (such as an integrated circuit module including a single wafer) installed on each of the terminals described above.

2. CONFIGURATION EXAMPLES OF NETWORK SIDE DEVICE

Figure 3:
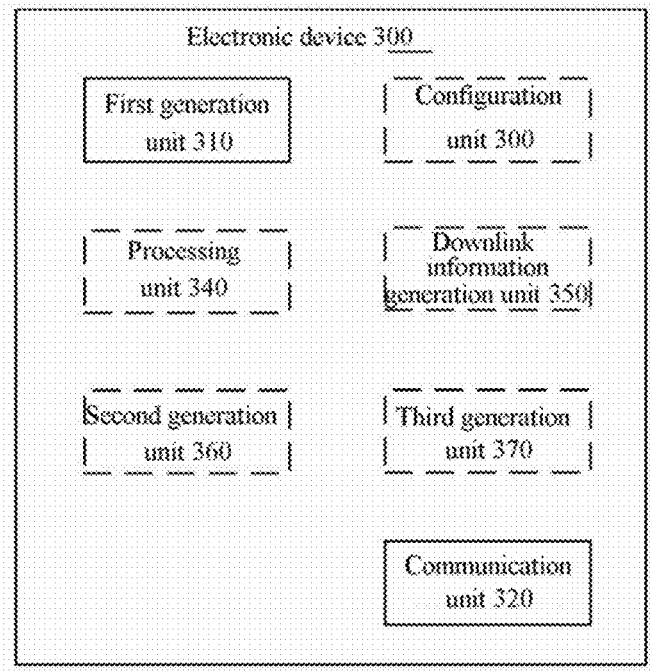
FIG. 3 is a block diagram showing a configuration example of an electronic device as a network side device according to an embodiment of the present disclosure.

FIG. 3 is a block diagram showing a configuration example of an electronic device 300 according to an embodiment of the present disclosure. The electronic device 300 here may serve as a network side device in a wireless communication system, specifically, serving as a base station device in the wireless communication system.

As shown in FIG. 3, the electronic device 300 may include a first generation unit 310 and a communication unit 320.

Here, each unit of the electronic device 300 may be included in a processing circuit. It should be noted that, the electronic device 300 may include one or more processing circuits. Further, the processing circuit may include various discrete functional units for performing various functions and/or operations. It should be noted that these functional units may be physical entities or logical entities, and units with different names may be implemented by a same physical entity.

According to the embodiment of the present disclosure, the first generation unit 310 may generate a first downlink control signaling. Here, the first downlink control signaling generated by the first generation unit 310 may include first frequency domain indication information and first beam indication information, and a frequency domain resource indicated by the first frequency domain indication information is the same as a frequency domain resource corresponding to a beam indicated by the first beam indication information.

According to the embodiment of the present disclosure, the electronic device 300 may transmit the first downlink control signaling generated by the first generation unit 310 to a user equipment through the communication unit 320.

It can be seen that, with the electronic device 300 according to the embodiment of the present disclosure, a downlink control signaling includes frequency domain indication information and beam indication information, and a frequency domain resource indicated by the frequency domain indication information is the same as a frequency domain resource corresponding to a beam indicated by the beam indication information. In this way, a beam and a frequency domain resource may be correctly indicated in a case that the beam is bound to the frequency domain resource, to prevent a case in which the user equipment could not perform receipt or transmission normally due to the frequency domain resource indicated by the frequency domain indication information being different from the frequency domain resource corresponding to the beam indicated by the beam indication information.

According to the embodiment of the present disclosure, the first downlink control signaling may include a downlink control signaling for downlink scheduling (that is, a signaling for controlling downlink transmission) and a downlink control signaling for uplink scheduling (that is, a signaling for controlling uplink transmission). In a case that the first downlink control signaling is the downlink control signaling for downlink scheduling, the first frequency domain indication information included in the first downlink control signaling is used to indicate a downlink frequency domain resource, and the first beam indication information included in the first downlink control signaling is used to indicate the downlink transmission beam. Similarly, in a case that the first downlink control signaling is the downlink control signaling for uplink scheduling, the first frequency domain indication information included in the first downlink control signaling is used to indicate an uplink frequency domain resource, and the first beam indication information included in the first downlink control signaling is used to indicate the uplink transmission beam.

According to the embodiment of the present disclosure, the frequency domain resources include, but are not limited to, BWP. The frequency domain indication information may include identification information of a frequency domain resource. For example, in a case that the frequency domain resources are BWP, the first frequency domain indication information may be BWP ID.

According to an embodiment of the present disclosure, a beam may be represented by a reference signal. For example, a downlink reference signal, such as CSI-RS, may be used to represent a downlink transmission beam. The first beam indication information for indicating the downlink transmission beam may be a Transmission Configuration Indicator (TCI) state, because there is a correspondence between the TCI state and the downlink reference signal. Therefore, a unique downlink reference signal of quasi co-location type D (QCL type D) may be determined according to the TCI state, so as to determine the downlink transmission beam. Similarly, an uplink reference signal, such as SRS, may be used to represent an uplink transmission beam. The first beam indication information for indicating the uplink transmission beam may be spatial relationship information (SpatialRelationInfo) or SRS Resource Indicator (SRI), because SpatialRelationInfo or SRI has a correspondence with the uplink reference signal SRS. Therefore, a unique uplink reference signal may be determined according to SpatialRelationInfo or SRI, so as to determine the uplink transmission beam. In addition, if there is a correspondence between TCI and an uplink reference signal, the first beam indication information for indicating the uplink transmission beam may also be TCI.

According to the embodiment of the present disclosure, as shown in FIG. 3, the electronic device 300 may further include a configuration unit 330. The configuration unit 330 is configured to configure a correspondence between frequency domain resources and beams. According to the embodiment of the present disclosure, there is a correspondence between downlink frequency domain resources and downlink transmission beams, and there is a correspondence between uplink frequency domain resources and uplink transmission beams. The configuration unit 330 may configure such correspondences. Further, the electronic device 300 may transmit such correspondences to the user equipment through the communication unit 320. For example, the electronic device 300 may carry such correspondences through RRC signaling.

For example, in a case that the first downlink control signaling is a downlink control signaling for downlink scheduling, frequency domain resources are BWPs, beams are represented by CSI-RS, and the first beam indication information is represented by the TCI state, one of correspondences generated by the configuration unit 330 may be as follows.

```
TCI-State ::= SEQUENCE {
tci-StateId TCI#1,
qcl-Type1 QCL-Info,
}
QCL-Info ::= SEQUENCE {
bwp-Id BWP#1
referenceSignal CHOICE {
csi-rs NZP-CSI-RS-Resource#3,
},
qcl-Type ENUMERATED {typeD},
...
}
```

As described above, in this correspondence, a TCI state ID is TCI state 1, and a downlink transmission beam indicated by the TCI state ID is a downlink transmission beam represented by CSI-RS resource 3. A frequency domain resource where CSI-RS resource 3 is located is BWP1. That is, through this correspondence, the user equipment may determine that the downlink transmission beam represented by the CSI-RS resource 3 is bound to BWP1. Further, the correspondences generated by the configuration unit 330 may include multiple such correspondences, so as to configure the correspondence between the downlink transmission beams and the downlink frequency domain resources for the user equipment.

An example in which the configuration unit 330 configures the correspondence between the downlink transmission beams and the downlink frequency domain resources is described above. The configuration unit 330 may further configure the correspondence between the uplink transmission beams and the uplink frequency domain resources for the user equipment in a similar manner, which is not repeated in the present disclosure.

According to the embodiment of the present disclosure, the first downlink control signaling may be Downlink Control Information (DCI).

In a case that the DCI is DCI for downlink scheduling, after the configuration unit 330 configures the correspondence between the downlink transmission beams and the downlink frequency domain resources, the first generation unit 310 may generate DCI. The DCI includes BWP ID and a TCI state, and a downlink BWP indicated by the BWP ID is the same as a downlink BWP corresponding to the downlink transmission beam indicated by the TCI state. Similarly, in a case that the DCI is used for uplink scheduling, after the configuration unit 330 configures the correspondence between the uplink transmission beams and the uplink frequency domain resources, the first generation unit 310 may generate DCI. The DCI includes BWP ID and SpatialRelationInfo/SRI, and an uplink BWP indicated by the BWP ID is the same as an uplink BWP corresponding to an uplink transmission beam indicated by the SpatialRelationInfo/SRI.

In the art, a downlink BWP in a DCI for downlink scheduling is normally used to indicate downlink frequency domain resources of downlink data information and downlink control information, and a TCI state in the DCI is normally used to indicate a downlink transmission beam of the downlink data information. Since the downlink BWP and the TCI state are indicated separately, it could not be guaranteed that the downlink BWP is the same as the downlink BWP corresponding to the downlink transmission beam indicated by the TCI state in a case that the downlink BWP is bound to the downlink transmission beam. According to the embodiment of the present disclosure, the first generation unit 310 makes the downlink BWP be the same as the downlink BWP corresponding to the downlink transmission beam indicated by the TCI state when generating the DCI, so that the downlink BWP and the downlink transmission beam may be correctly indicated in a case that the downlink BWP is bound to the downlink transmission beam. This advantage is also applicable to the DCI for uplink scheduling.

The embodiments of the present disclosure are described below in connection with the DCI for downlink scheduling and the DCI for uplink scheduling.

According to an embodiment of the present disclosure, in a case that the DCI is used for downlink scheduling, downlink frequency domain resources for downlink data information (carried by using PDSCH) and downlink control information (carried by using PDCCH) may be indicated with first frequency domain indication information, and a downlink transmission beam for downlink data information may be indicated with first beam indication information.

According to an embodiment of the present disclosure, the electronic device 300 may indicate the downlink transmission beam for downlink control information in an implicit manner. For example, the electronic device 300 and the user equipment agree that a downlink transmission beam for downlink control information is the same as a downlink transmission beam for downlink data information.

According to an embodiment of the present disclosure, as shown in FIG. 3, the electronic device 300 may further include a processing unit 340. The processing unit 340 is configured to determine a downlink transmission beam and a downlink frequency domain resource for transmitting downlink data information and a downlink transmission beam and a downlink frequency domain resource for transmitting downlink control information, determine an uplink transmission beam and an uplink frequency domain resource for transmitting uplink data information and an uplink transmission beam and an uplink frequency domain resource for transmitting uplink control information by the user equipment, and determine an uplink receiving beam and an uplink frequency domain resource for receiving the uplink data information and an uplink receiving beam and an uplink frequency domain resource for receiving the uplink control information according to the uplink transmission beam and the uplink frequency domain resource for transmitting the uplink data information and the uplink transmission beam and the uplink frequency domain resource for transmitting the uplink control information by the user equipment.

According to an embodiment of the present disclosure, in a case that the processing unit 340 determines a downlink frequency domain resource for transmitting downlink data information and a downlink frequency domain resource for transmitting downlink control information, the electronic device 300 may indicate such downlink frequency domain resources by using first frequency domain indication information in the DCI. Further, in a case that the processing unit 340 determines a downlink transmission beam for transmitting downlink data information, the electronic device 300 may indicate such a downlink transmission beam by using first beam indication information in the DCI. Further, the processing unit 340 may determine that a downlink transmission beam for transmitting the downlink control information is the same as the downlink transmission beam for transmitting the downlink data information.

As shown in FIG. 3, the electronic device 300 may further include a downlink information generation unit 350. The downlink information generation unit 350 is configured to generate downlink data information and downlink control information. According to an embodiment of the present disclosure, the electronic device 300 may transmit the downlink data information and the downlink control information generated by the downlink information generation unit 350 according to the downlink transmission beams determined by the processing unit 340 on the downlink frequency domain resources determined by the processing unit 340.

For example, in a case that DCI includes TCI1 and BWP1, the electronic device 300 may transmit the downlink control information and the downlink data information by using a downlink transmission beam represented by TCI1 on BWP1, and the user equipment may determine a downlink receiving beam according to the downlink transmission beam represented by TCI1, and receive the downlink control information and the downlink data information by using the downlink receiving beam on BWP1.

Figure 4:
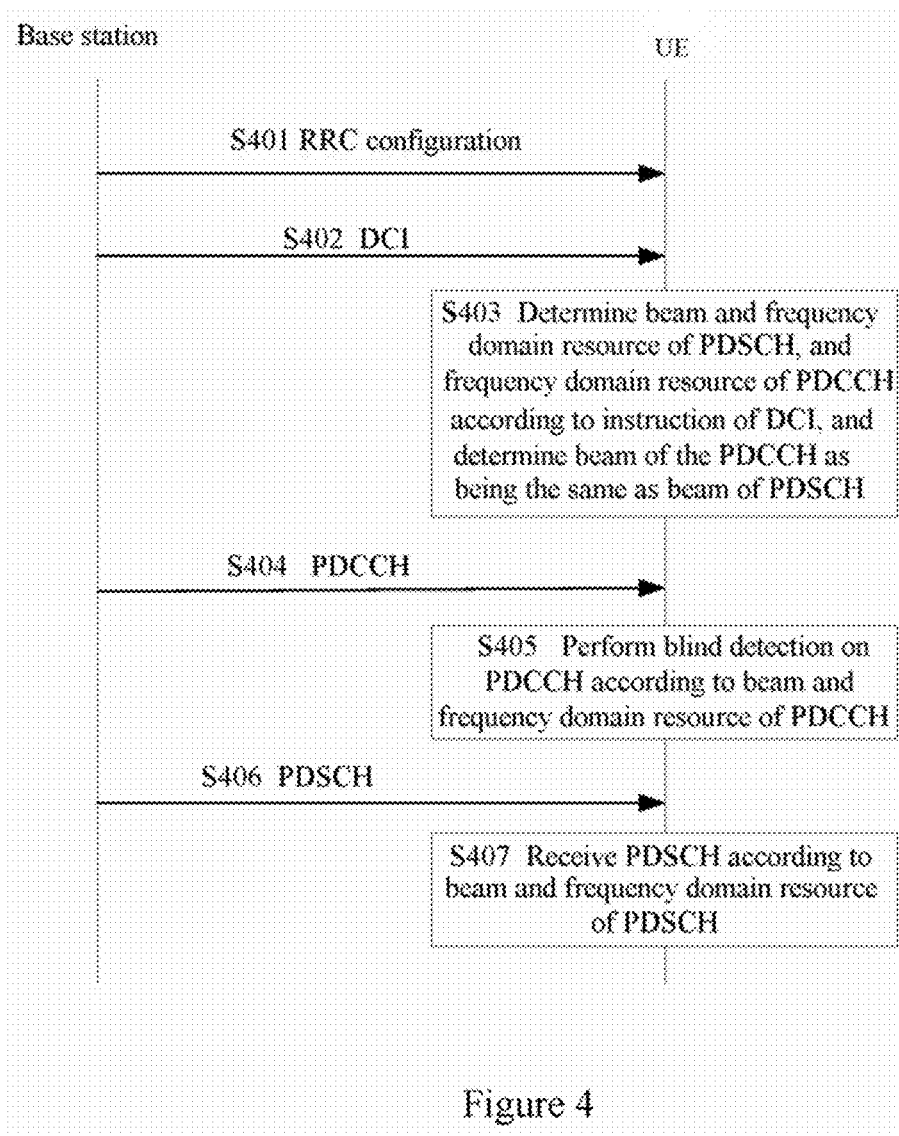
FIG. 4 is a signaling flow chart for indicating beams and frequency domain resources according to an embodiment of the present disclosure.

FIG. 4 is a signaling flow chart for indicating beams and frequency domain resources according to an embodiment of the present disclosure. In FIG. 4, the base station may be implemented by the electronic device 300. As shown in FIG. 4, in step S401, the base station transmits an RRC configuration to UE, to configure a binding relationship between downlink transmission beams and downlink frequency domain resources. In step S402, the base station transmits DCI to the UE, and the DCI includes first frequency domain indication information and first beam indication information. In step S403, the UE determines a downlink transmission beam and a downlink frequency domain resource of PDSCH, and a downlink frequency domain resource of PDCCH according to an instruction of the DCI, and determines a downlink transmission beam of the PDCCH as being the same as the downlink transmission beam of the PDSCH. In step S404, the base station transmits the PDCCH to the UE. In step S405, the UE performs blind detection on the PDCCH according to the downlink transmission beam and the downlink frequency domain resource of the PDCCH. In step S406, the base station transmits the PDSCH to the UE. In step S407, the UE receives the PDSCH according to the downlink transmission beam and the downlink frequency domain resource of the PDSCH. As shown above, FIG. 4 shows the signaling flow chart for indicating beams and frequency domain resources in a case that the DCI is used for downlink scheduling and the base station indicates the downlink transmission beam of the PDCCH in the implicit manner.

According to an embodiment of the present disclosure, the electronic device 300 may also indicate a downlink transmission beam for transmitting downlink control information in an explicit manner. For example, the downlink information generation unit 350 may generate such downlink data information that includes beam indication information for indicating the downlink transmission beam of the downlink control information. The downlink transmission beam of the downlink control information is the same as the downlink transmission beam indicated by the first beam indication information. In an embodiment, MAC CE included in the downlink data information may be used to carry the beam indication information for indicating the downlink transmission beam of the downlink control information. Here, the beam indication information for indicating the downlink transmission beam of the downlink control information may also be a TCI state.

According to an embodiment of the present disclosure, in a case that the processing unit 340 determines a downlink frequency domain resource for transmitting downlink data information and a downlink frequency domain resource for transmitting downlink control information, the electronic device 300 may indicate such downlink frequency domain resources by using first frequency domain indication information in the DCI. Further, in a case that the processing unit 340 determines a downlink transmission beam for transmitting the downlink data information, the electronic device 300 may indicate such a downlink transmission beam by using first beam indication information in the DCI. Further, the processing unit 340 may determine a downlink transmission beam for transmitting the downlink control information as being the same as the downlink transmission beam for transmitting the downlink data information. The electronic device 300 may indicate the downlink transmission beam of the downlink control information by using beam indication information included in the downlink data information generated by the generation unit 350.

According to an embodiment of the present disclosure, the electronic device 300 may transmit the downlink data information and the downlink control information generated by the downlink information generation unit 350 according to the downlink transmission beam determined by the processing unit 340 on the downlink frequency domain resource determined by the processing unit 340.

According to an embodiment of the present disclosure, in a case that a beam is represented by using a reference signal identification, that is, the beam indicated by the first beam indication information is represented by using a downlink reference signal identification and the beam of the downlink control information is indicated by using a downlink reference signal identification, a reference signal included in the first beam indication information may be the same as a reference signal included in the beam indication information for indicating the beam of the downlink control information.

For example, in a case that DCI includes TCI1 and BWP1, the electronic device 300 may transmit the downlink control information and the downlink data information by using the downlink transmission beam represented by TCI1 on BWP1. The downlink data information includes MAC CE, which includes TCI1. TCI1 in DCI and TCI1 in MAC CE in the downlink data information represent a same reference signal identification. The user equipment may determine a downlink receiving beam according to the downlink transmission beam represented by TCI1, and receive downlink data information on BWP1 by using the downlink receiving beam. Further, the user equipment determines that the MAC CE included in the downlink data information also includes TCI1. The downlink transmission beam represented by the TCI1 is the same as the downlink transmission beam represented by the TCI1 in DCI, so that the downlink receiving beam is determined according to the downlink transmission beam represented by the TCI1, and the downlink control information is received on BWP1 using the downlink receiving beam.

According to the embodiment of the present disclosure, the reference signal included in the first beam indication information has a quasi co-location (QCL) relationship with the reference signal included in the beam indication information for indicating the beam of the downlink control information. Here, the quasi co-location relationship between two different reference signals is that the two reference signals are different, and beams represented by the two reference signals are the same with each other.

For example, in a case that DCI includes TCI1 and BWP1, the electronic device 300 may transmit the downlink control information and the downlink data information by using the downlink transmission beam represented by TCI1 on BWP1. The downlink data information includes MAC CE, and the MAC CE includes TCI2. A reference signal represented by TCI1 in DCI has a quasi co-location relationship with a reference signal represented by TCI2 in MAC CE in the downlink data information. The user equipment may determine a downlink receiving beam according to the downlink transmission beam represented by TCI1, and receive the downlink data information by using the downlink receiving beam on BWP1. Further, the user equipment determines that the MAC CE included in the downlink data information includes TCI2. A downlink transmission beam represented by the TCI2 is the same as the downlink transmission beam represented by TCI1 in DCI, so that the downlink receiving beam is determined according to the downlink transmission beam represented by TCI2, and the downlink control information is received on BWP1 by using the downlink receiving beam.

The configuration of the above TCI1 and TCI2 may be as follows.

```
TCI-State ::= SEQUENCE {
tci-StateId TCI#1,
qcl-Type1 QCL-Info,
}
QCL-Info ::= SEQUENCE {
bwp-Id BWP#1
referenceSignal CHOICE {
csi-rs NZP-CSI-RS-Resource#3,
},
qcl-Type ENUMERATED {typeD},
...
}
TCI-State ::= SEQUENCE {
tci-StateId TCI#2,
qcl-Type1 QCL-Info,
}
QCL-Info ::= SEQUENCE {
referenceSignal CHOICE {
ssb SSB-Index#3,
},
qcl-Type ENUMERATED {typeD},
...
}
```

As described above, the reference signal represented by TCI1 is CSI-RS resource 3, and the reference signal represented by TCI2 is SSB3. Although the CSI-RS resource 3 is different from SSB3, the CSI-RS resource 3 and SSB3 represent a same downlink transmission beam.

Figure 5:
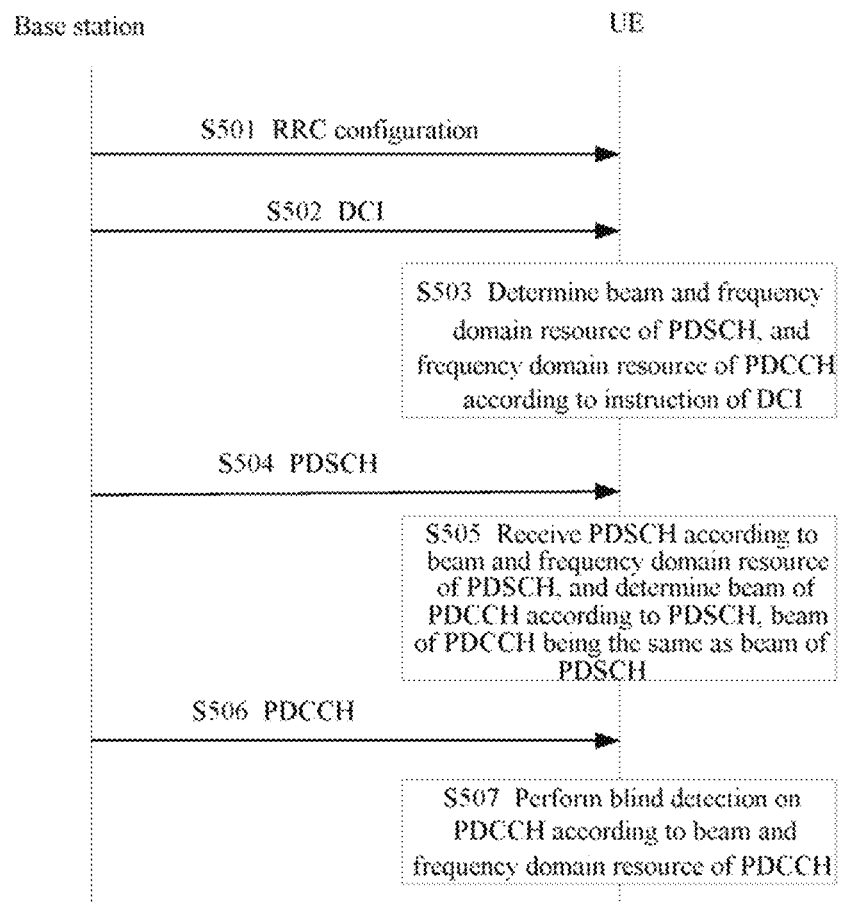
FIG. 5 is a signaling flow chart for indicating beams and frequency domain resources according to an embodiment of the present disclosure.

FIG. 5 is a signaling flow chart for indicating beams and frequency domain resources according to an embodiment of the present disclosure. In FIG. 5, the base station may be implemented by the electronic device 300. As shown in FIG. 5, in step S501, the base station transmits an RRC configuration to UE, to configure a binding relationship between downlink transmission beams and downlink frequency domain resources. In step S502, the base station transmits DCI to the UE, and the DCI includes first frequency domain indication information and first beam indication information. In step S503, the UE determines a downlink transmission beam and a downlink frequency domain resource of PDSCH, and a downlink frequency domain resource of PDCCH according to an instruction of the DCI. In step S504, the base station transmits the PDSCH to the UE. In step S505, the UE receives the PDSCH according to the downlink transmission beam and the downlink frequency domain resource of the PDSCH, and determines the downlink transmission beam of the PDCCH according to the MAC CE in the PDSCH, wherein the downlink transmission beam of the PDCCH is the same as the downlink transmission beam of the PDSCH. In step S506, the base station transmits PDCCH to the UE. In step S507, the UE performs blind detection on the PDCCH according to the downlink transmission beam and the downlink frequency domain resource of the PDCCH. As shown above, FIG. 5 shows the signaling flow chart for indicating beams and frequency domain resources in a case that the DCI is used for downlink scheduling and the base station indicates the downlink transmission beam of PDCCH in the explicit manner.

In the art, the downlink transmission beam of the downlink control information and the downlink transmission beam of the downlink data information are indicated separately. Therefore, in a case that only one downlink BWP is activated, the downlink transmission beam of the downlink control information cannot be ensured to be the same as the downlink transmission beam of the downlink data information. As described above, according to the embodiment of the present disclosure, the electronic device 300 may make the downlink transmission beam of the downlink control information be the same as the downlink transmission beam of the downlink data information, and may represent the downlink transmission beam of the downlink control information in an implicit or explicit manner, thereby ensuring that the downlink transmission beam of the downlink control information is the same as the downlink transmission beam of the downlink data information.

According to the embodiment of the present disclosure, in a case that there is downlink information to be scheduled, the first generation unit 310 may generate DCI as described above, and determine states or values of other fields in the DCI according to the downlink information to be scheduled, so that the user equipment may receive downlink data information and downlink control information according to the DCI. In addition, in the absence of downlink information to be scheduled, the first generation unit 310 may generate DCI as described above, and set at least a part of fields other than the first frequency domain indication information and the first beam indication information as a specific value. For example, the first generation unit 310 may set a field indicating a time domain and a frequency domain resource where the downlink data information is located, a field regarding a HARQ process number, and the like, as specific values. The specific values include but are not limited to all 0 or all 1. In this way, the user equipment may determine that the DCI is only used to indicate the downlink frequency domain resource and the downlink transmission beam, without demodulating the downlink data information or the downlink control information.

According to the embodiment of the present disclosure, in a case that DCI is used for uplink scheduling, uplink frequency domain resources for uplink data information (carried by using PUSCH) and uplink control information (carried by using PUCCH) may be indicated with the first frequency domain indication information, and an uplink transmission beam for uplink data information may be indicated with the first beam indication information.

According to the embodiment of the present disclosure, the electronic device 300 may indicate an uplink transmission beam for uplink control information in the implicit manner. For example, the electronic device 300 and the user equipment agree that the uplink transmission beam for uplink control information is the same as the uplink transmission beam for uplink data information.

According to the embodiment of the present disclosure, in a case that the processing unit 340 determines uplink frequency domain resources for transmitting uplink data information and uplink control information, the electronic device 300 may indicate such uplink frequency domain resources by using the first frequency domain indication information in the DCI. Further, in a case that the processing unit 340 determines an uplink transmission beam for transmitting uplink data information, the electronic device 300 may indicate such an uplink transmission beam by using the first beam indication information in the DCI. Further, the processing unit 340 may determine that an uplink transmission beam for transmitting uplink control information is the same as the uplink transmission beam for transmitting uplink data information.

According to the embodiment of the present disclosure, the electronic device 300 may determine an uplink receiving beam according to the uplink transmission beam determined by the processing unit 340, and may receive uplink data information and uplink control information according to the uplink receiving beam on the uplink frequency domain resources determined by the processing unit 340.

For example, in a case that DCI includes SpatialRelationInfo1/SRI1 and BWP1, the user equipment may transmit uplink control information and uplink data information by using an uplink transmission beam represented by SpatialRelationInfo1/SRI1 on BWP1. The electronic device 300 may determine an uplink receiving beam according to the uplink transmission beam represented by SpatialRelationInfo1/SRI1, and receive the uplink control information and the uplink data information by using the uplink receiving beam on BWP1.

Figure 6:
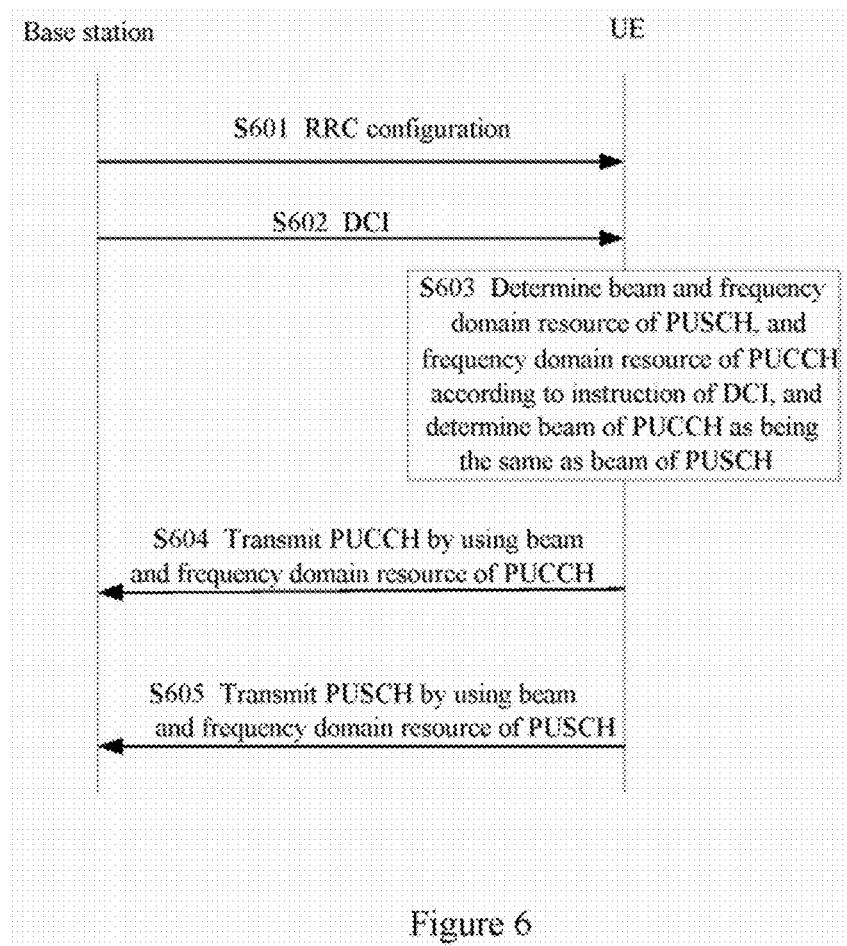
FIG. 6 is a signaling flow chart for indicating beams and frequency domain resources according to an embodiment of the present disclosure.

FIG. 6 is a signaling flow chart for indicating beams and frequency domain resources according to an embodiment of the present disclosure. In FIG. 6, the base station may be implemented by the electronic device 300. As shown in FIG. 6, in step S601, the base station transmits an RRC configuration to UE, to configure a binding relationship between uplink transmission beams and uplink frequency domain resources. In step S602, the base station transmits DCI to the UE, and the DCI includes first frequency domain indication information and first beam indication information. In step S603, the UE determines an uplink transmission beam and an uplink frequency domain resource of PUSCH, and an uplink frequency domain resource of PUCCH according to an instruction of the DCI, and determines an uplink transmission beam of the PUCCH as being the same as the uplink transmission beam of the PUSCH. In step S604, the UE transmits the PUCCH to the base station according to the uplink transmission beam and the uplink frequency domain resource of the PUCCH. In step S605, the UE transmits the PUSCH to the base station according to the uplink transmission beam and the uplink frequency domain resource of the PUSCH. As shown above, FIG. 6 shows the signaling flow chart for indicating beams and frequency domain resources in a case that the DCI is used for uplink scheduling and the base station indicates the uplink transmission beam of the PUCCH in the implicit manner.

In the art, the uplink transmission beam of the uplink control information and the uplink transmission beam of the uplink data information are indicated separately. Therefore, in a case that only one uplink BWP is activated, the uplink transmission beam of the uplink control information cannot be ensured to be the same as the uplink transmission beam of the uplink data information. As described above, according to the embodiment of the present disclosure, the electronic device 300 may make the uplink transmission beam of the uplink control information be the same as the uplink transmission beam of the uplink data information, and may represent the uplink transmission beam of the uplink control information in the implicit manner, thereby ensuring that the uplink transmission beam of the uplink control information is the same as the uplink transmission beam of the uplink data information.

According to the embodiment of the present disclosure, in a case that there is uplink information to be scheduled, the first generation unit 310 may generate DCI as described above, and determine states or values of other fields in the DCI according to the uplink information to be scheduled, and determine a state or value of other fields in the DCI according to the uplink information to be scheduled, so that the user equipment may transmit uplink data information and uplink control information according to the DCI. In addition, in the absence of uplink information to be scheduled, the first generation unit 310 may generate DCI as described above, and set at least a part of fields other than the first frequency domain indication information and the first beam indication information as a specific value. For example, the first generation unit 310 may set a field indicating a time domain and a frequency domain resource where the uplink data information is located, a field regarding a HARQ process number, and the like, as specific values. The specific values include but are not limited to all 0 or all 1. In this way, the user equipment may determine that the DCI is only used to indicate the uplink frequency domain resource and uplink transmission beam, without transmitting the uplink data information or the uplink control information.

The first downlink control signaling according to the embodiment of the present disclosure is described in detail as described above.

According to an embodiment of the present disclosure, as shown in FIG. 3, the electronic device 300 may further include a second generation unit 360. The second generation unit 360 is configured to generate a second downlink control signaling. The second downlink control signaling may include second beam indication information. The second beam indication information is used to indicate a beam of downlink control information or used to indicate a beam of uplink control information.

According to an embodiment of the present disclosure, the electronic device 300 may transmit the second downlink control signaling generated by the second generation unit 360 to the user equipment through the communication unit 320.

According to an embodiment of the present disclosure, the second downlink control signaling may be a downlink control signaling for downlink activation (that is, a signaling for controlling downlink transmission) or a downlink control signaling for uplink activation (that is, a signaling for controlling uplink transmission). In a case that the second downlink control signaling is the downlink control signaling for downlink activation, the second beam indication information included in the second downlink control signaling is used to indicate the downlink transmission beam of downlink control information. In a case that the second downlink control signaling is the downlink control signaling for uplink activation, the second beam indication information included in the second downlink control signaling is used to indicate the uplink transmission beam of uplink control information.

Similar to the first beam indication information, the second beam indication information may be a TCI state, and may also be SpatialRelationInfo or SRI.

According to an embodiment of the present disclosure, the second downlink control signaling may be MAC CE.

In a case that the MAC CE is a MAC CE for downlink activation, the MAC CE includes a TCI state. The TCI state is used to indicate the downlink transmission beam of downlink control information. Similarly, in a case that the MAC CE is a MAC CE for uplink activation, the MAC CE includes SpatialRelationInfo, and SpatialRelationInfo indicates the uplink transmission beam of uplink control information.

Embodiments of the present disclosure are described below respectively for MAC CE for downlink activation and MAC CE for uplink activation.

In a case that MAC CE is a MAC CE for downlink activation, according to the embodiment of the present disclosure, the configuration unit 330 may determine that a downlink frequency domain resource for downlink control information is a frequency domain resource corresponding to a downlink transmission beam for downlink control information after determining the downlink transmission beam for downlink control information. Further, the configuration unit 330 may determine that a downlink frequency domain resource for downlink data information is the same as the downlink frequency domain resource for downlink control information, and that the downlink transmission beam for downlink data information is the same as the downlink transmission beam for downlink control information. That is, the electronic device 300 may implicitly indicate the downlink frequency domain resource and the downlink transmission beam for downlink data information, that is, the electronic device 300 and the user equipment agree that the downlink frequency domain resource for downlink data information is the same as the downlink frequency domain resource for downlink control information, and the downlink transmission beam for downlink data information is the same as the downlink transmission beam for downlink control information.

According to an embodiment of the present disclosure, the downlink information generation unit 350 may generate downlink control information and downlink data information. The electronic device 300 may transmit the downlink data information and the downlink control information on the downlink frequency domain resource determined by the configuration unit 330 by using the downlink transmission beam determined by the configuration unit 330, through the communication unit 320. Further, the user equipment may determine downlink transmission beams for transmitting the downlink control information and the downlink data information, and determine a downlink receiving beam according to MAC CE, so as to receive the downlink control information and the downlink data information by using the downlink receiving beam and the downlink frequency domain resource.

For example, MAC CE includes TCI state 1. A reference signal corresponding to the TCI state 1 is CSI-RS resource 3. A downlink frequency domain resource corresponding to a downlink transmission beam represented by CSI-RS resource 3 is BWP1, and then the electronic device 300 may transmit downlink control information and downlink data information on BWP1 by using the downlink transmission beam represented by CSI-RS resource 3.

Figure 7:
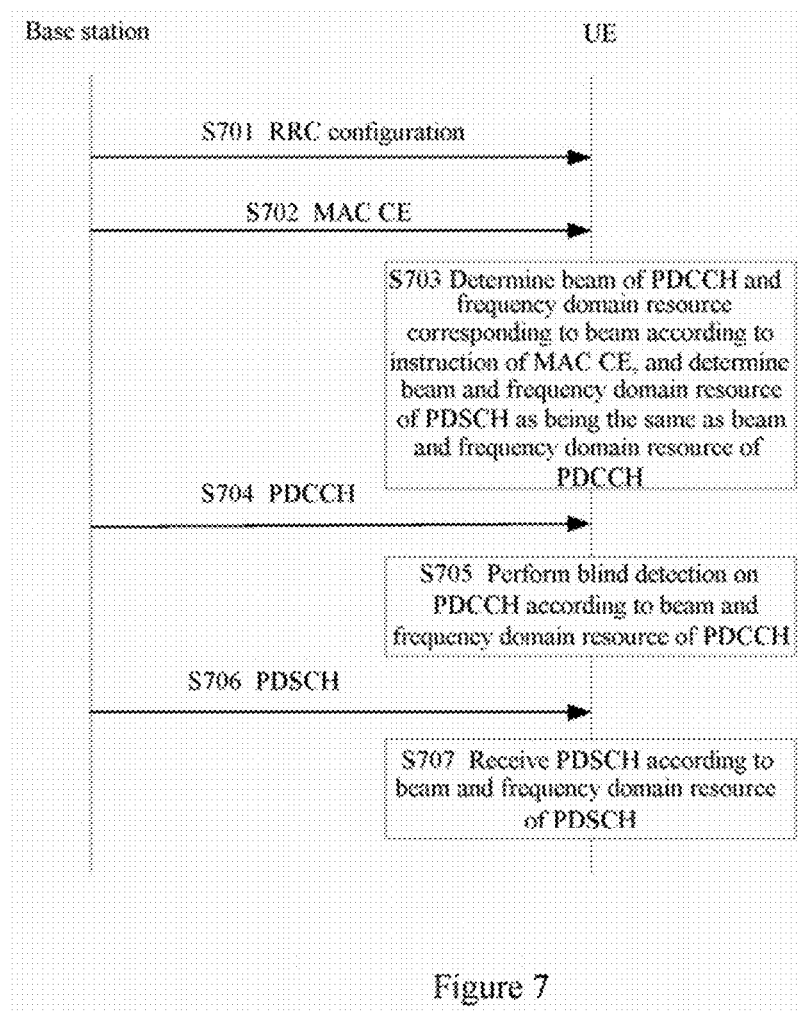
FIG. 7 is a signaling flow chart for indicating beams and frequency domain resources according to an embodiment of the present disclosure.

FIG. 7 is a signaling flow chart for indicating beams and frequency domain resources according to an embodiment of the present disclosure. In FIG. 7, the base station may be implemented by the electronic device 300. As shown in FIG. 7, in step S701, the base station transmits an RRC configuration to UE to configure a binding relationship between downlink transmission beams and downlink frequency domain resources. In step S702, the base station transmits MAC CE to the UE, and the MAC CE includes second beam indication information. In step S703, the UE determines a downlink transmission beam of PDCCH and a downlink frequency domain resource corresponding to the downlink transmission beam according to an instruction of the MAC CE, and determines a downlink transmission beam and a downlink frequency domain resource of the PDSCH as being the same as the downlink transmission beam and the downlink frequency domain resource of PDCCH, respectively. In step S704, the base station transmits the PDCCH to the UE. In step S705, the UE performs blind detection on the PDCCH according to the downlink transmission beam and the downlink frequency domain resource of the PDCCH. In step S706, the base station transmits the PDSCH to the UE. In step S707, the UE receives the PDSCH according to the downlink transmission beam and the downlink frequency domain resource of the PDSCH. As shown above, FIG. 7 shows the signaling flow chart for indicating beams and frequency domain resources in a case that MAC CE is a MAC CE for downlink activation.

According to an embodiment of the present disclosure, in a case that the MAC CE is a MAC CE for uplink activation, the configuration unit 330 may determine that an uplink frequency domain resource for uplink control information is a frequency domain resource corresponding to an uplink transmission beam for uplink control information after determining the uplink transmission beam for uplink control information. Further, the configuration unit 330 may determine that an uplink frequency domain resource for uplink data information is the same as the uplink frequency domain resource for uplink control information, and that the uplink transmission beam for uplink data information is the same as a downlink transmission beam for uplink control information. That is, the electronic device 300 may implicitly indicate the uplink frequency domain resource and uplink transmission beam for uplink data information, that is, the electronic device 300 and the user equipment agree that the uplink frequency domain resource for uplink data information is the same as the uplink frequency domain resource for uplink control information, and the uplink transmission beam for uplink data information is the same as the uplink transmission beam for uplink control information.

According to an embodiment of the present disclosure, the user equipment may determine uplink transmission beams and uplink frequency domain resources for uplink control information and uplink data information according to the instruction of the MAC CE, and transmit the uplink control information and the uplink data information on the uplink frequency domain resources by using the uplink transmission beams. The electronic device 300 may determine an uplink receiving beam according to the uplink transmission beams, and receive uplink data information and uplink control information on the uplink frequency domain resources by using the uplink receiving beam.

For example, MAC CE includes SpatialRelationInfo1. A reference signal corresponding to the SpatialRelationInfo1 is SRS resource 3. An uplink frequency domain resource corresponding to an uplink transmission beam represented by SRS resource 3 is BWP1, and then the user equipment may transmit uplink control information and uplink data information on BWP1 by using the uplink transmission beam represented by SRS resource 3.

Figure 8:
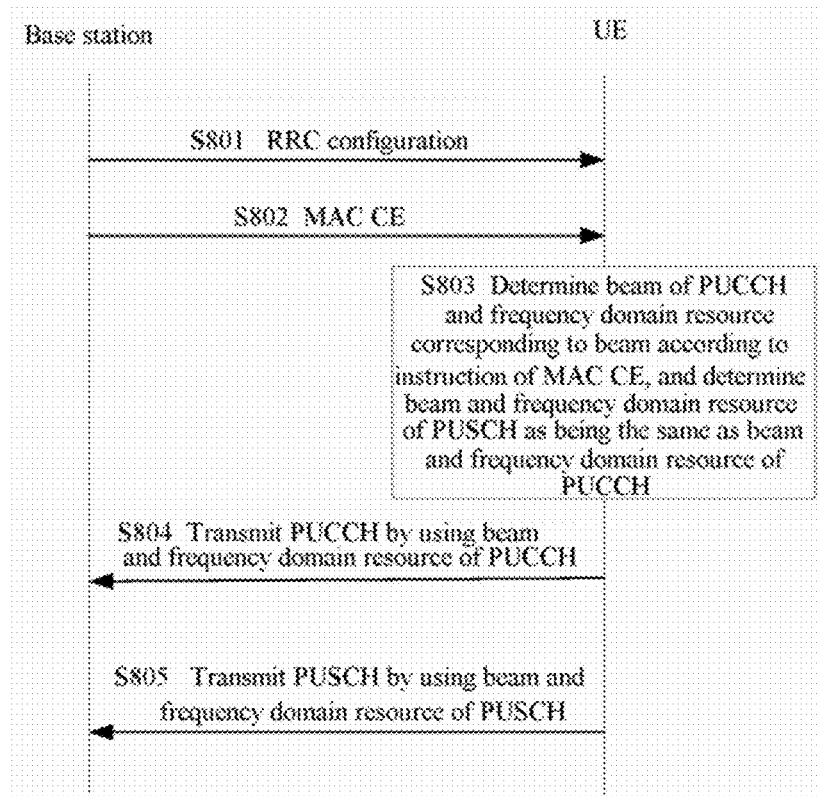
FIG. 8 is a signaling flow chart for indicating beams and frequency domain resources according to an embodiment of the present disclosure.

FIG. 8 is a signaling flow chart for indicating beams and frequency domain resources according to an embodiment of the present disclosure. In FIG. 8, the base station may be implemented by the electronic device 300. As shown in FIG. 8, in step S801, the base station transmits an RRC configuration to UE to configure a binding relationship between uplink transmission beams and uplink frequency domain resources. In step S802, the base station transmits MAC CE to the UE, and the MAC CE includes second beam indication information. In step S803, the UE determines an uplink transmission beam of PUCCH and an uplink frequency domain resource corresponding to the uplink transmission beam according to an instruction of the MAC CE, and determines an uplink transmission beam and an uplink frequency domain resource of PUSCH as being the same as the uplink transmission beam and the uplink frequency domain resource of PUCCH, respectively. In step S804, the UE transmits the PUCCH according to the uplink transmission beam and the uplink frequency domain resource of the PUCCH. In step S805, the UE transmits the PUSCH according to the uplink transmission beam and the uplink frequency domain resource of PUSCH. As shown above, FIG. 8 shows the signaling flow chart for indicating beams and frequency domain resources in a case that MAC CE is a MAC CE for uplink activation.

In the art, the TCI state in the MAC CE for downlink activation is normally used to indicate the downlink transmission beam of downlink control information. Therefore, in a case that a downlink BWP is bound to a downlink transmission beam, it cannot be ensured that the downlink BWP is the same as a downlink BWP corresponding to the downlink transmission beam indicated by the TCI state. In addition, in a case that only one downlink BWP is activated, a downlink transmission beam of downlink control information cannot be ensured to be the same as a downlink transmission beam of downlink data information. According to an embodiment of the present disclosure, in a case that MAC CE indicates the downlink transmission beam of downlink control information, the electronic device 300 and the user equipment may agree that a downlink frequency domain resource of the downlink control information is a downlink frequency domain resource corresponding to the downlink transmission beam of downlink control information, and the downlink transmission beam of downlink data information and a downlink frequency domain resource of downlink data information are the same as those of the downlink control information, so that the downlink transmission beam and the downlink frequency domain resource are correctly indicated in a case that the downlink transmission beam is bound to the downlink frequency domain resource. This advantage is also applicable to uplink scheduling.

The second downlink control signaling according to the embodiment of the present disclosure is described in detail as described above.

According to the embodiment of the present disclosure, as shown in FIG. 3, the electronic device 300 may further include a third generation unit 370. The third generation unit 370 is configured to generate a third downlink control signaling. The third downlink control signaling may include third frequency domain indication information and third beam indication information. The third frequency domain indication information is used to indicate frequency domain resources of downlink control information and downlink data information, or used to indicate frequency domain resources of uplink control information and uplink data information. The third beam indication information is used to indicate beams of downlink control information and downlink data information, or used to indicate beams of uplink control information and uplink data information.

According to an embodiment of the present disclosure, the electronic device 300 may transmit the third downlink control signaling generated by the third generation unit 370 to a user equipment through the communication unit 320.

According to an embodiment of the present disclosure, the third downlink control signaling may include a downlink control signaling for downlink configuration (that is, a signaling for controlling downlink transmission) and a downlink control signaling for uplink configuration (that is, a signaling for controlling uplink transmission). In a case that the third downlink control signaling is the downlink control signaling for downlink configuration, the third frequency domain indication information included in the third downlink control signaling is used to indicate the downlink frequency domain resources of downlink data information and downlink control information, and the third beam indication information included in the third downlink control signaling is used to indicate the downlink transmission beams of downlink control information and downlink data information. Similarly, in a case that the third downlink control signaling is the downlink control signaling for uplink configuration, the third frequency domain indication information included in the third downlink control signaling is used to indicate the uplink frequency domain resources of uplink control information and uplink data information, and the third beam indication information included in the third downlink control signaling is used to indicate the uplink transmission beams of uplink control information and uplink data information.

According to an embodiment of the present disclosure, the frequency domain resource includes, but is not limited to, BWP. The frequency domain indication information may include identification information of the frequency domain resource. For example, in a case that the frequency domain resource is BWP, the third frequency domain indication information may be BWP ID.

According to an embodiment of the present disclosure, the third beam indication information may be a TCI state, and may also be SpatialRelationInfo or SRI.

According to an embodiment of the present disclosure, the third downlink control signaling may be RRC signaling. Embodiments of the present disclosure are described below respectively for an RRC signaling for downlink configuration and an RRC signaling for uplink configuration.

In a case that the RRC signaling is the RRC signaling for downlink configuration, according to an embodiment of the present disclosure, the electronic device 300 may set a default downlink frequency domain resource and a downlink transmission beam for each serving cell through the RRC signaling. For example, the electronic device 300 may carry the downlink frequency domain resource for the serving cell through a firstActiveDownlinkBWP-Id field in the RRC signaling. In addition, a TCIassociated with firstActive-DownlinkBWP-Id field may be added to the RRC signaling to carry the downlink transmission beam for the serving cell.

According to an embodiment of the present disclosure, the electronic device 300 may determine a current serving cell of the user equipment, determine the default downlink transmission beam set for the serving cell as the downlink transmission beam of downlink data information and the downlink transmission beam of downlink control information, and determine the default downlink frequency domain resource set for the serving cell as the downlink frequency domain resource of downlink data information and the downlink frequency domain resource of downlink control information. Further, the electronic device 300 may transmit the downlink control information and the downlink data information on downlink frequency domain resources of the downlink control information and the downlink data information, according to downlink transmission beams of the downlink control information and downlink data information, through the communication unit 320.

In this way, after the user equipment receives RRC reconfiguration information or the serving cell is activated, a downlink receiving beam may be determined according to the default downlink transmission beam set for the serving cell, and downlink data information and downlink control information may be received by using the downlink receiving beam on the default downlink frequency domain resource set for the serving cell.

In a case that the RRC signaling is the RRC signaling for uplink configuration, according to an embodiment of the present disclosure, the electronic device 300 may set a default uplink frequency domain resource and an uplink transmission beam for each serving cell through the RRC signaling. For example, the electronic device 300 may carry the uplink frequency domain resource for the serving cell through a firstActiveUplinkBWP Id field in the RRC signaling. In addition, a spatialRelationInfo associated with firstActiveUplinkBWP-Id field may be added in the RRC signaling to carry the uplink transmission beam for the serving cell.

According to an embodiment of the present disclosure, the electronic device 300 may determine a current serving cell of the user equipment, determine the default uplink transmission beam set for the serving cell as the uplink transmission beam of uplink data information and the uplink transmission beam of uplink control information, and determine the default uplink frequency domain resource set for the serving cell as the uplink frequency domain resource of uplink data information and the uplink frequency domain resources of uplink control information.

In this way, after the user equipment receives RRC reconfiguration information or a serving cell is activated, the uplink data information and the uplink control information are transmitted on the default uplink frequency domain resource set for the serving cell by using the default uplink transmission beam set for the serving cell. In this way, the electronic device 300 may determine an uplink receiving beam according to the uplink transmission beam, and receive uplink data information and uplink control information on the default uplink frequency domain resource set for the serving cell by using the uplink receiving beam.

The third downlink control signaling according to the embodiment of the present disclosure is described in detail as described above.

As described above, the first downlink control signaling (DCI), the second downlink control signaling (MAC CE) and the third downlink control signaling (RRC) according to the embodiments of the present disclosure are respectively described. Those skilled in the art may arbitrarily combine the three downlink control signalings as required. That is, the electronic device 300 may indicate frequency domain resources and beams by using one or more of the three downlink control signalings. Two non-limiting examples are described below.

For example, the electronic device 300 sets a downlink frequency domain resource of downlink control information and a downlink frequency domain resource of downlink data information, as well as a downlink transmission beam of downlink data information, through DCI, and agrees with the user equipment that a downlink transmission beam of downlink control information is the same as the downlink transmission beam of downlink data information. In a case that the downlink transmission beam of downlink control information is required to be switched, the electronic device 300 may inform the user equipment through MAC CE, and agree with the user equipment that the downlink frequency domain resource of downlink control information is switched to the downlink frequency domain resource corresponding to the downlink transmission beam of downlink control information, the downlink frequency domain resource of downlink data information is the same as the downlink frequency domain resource of downlink control information, and the downlink transmission beam of downlink data information is the same as the downlink transmission beam of downlink control information.

As another example, the electronic device 300 sets a default downlink frequency domain resource and a default downlink transmission beam for each serving cell through the RRC. In a case that it is required to switch the downlink frequency domain resource or the downlink transmission beam, the electronic device 300 may set a downlink frequency domain resource of downlink control information and a downlink frequency domain resource of downlink data information, as well as a downlink transmission beam of downlink data information, through DCI, and agree with the user equipment that the downlink transmission beam of downlink control information is the same as the downlink transmission beam of downlink data information.

It can be seen that, according to the embodiments of the present disclosure, a frequency domain resource and a beam may be correctly indicated in a case that the frequency domain resource is bound to the beam, and a frequency domain resource and a beam of data information may be ensured to be the same as a frequency domain resource and a beam of control information, respectively. In addition, according to the embodiment of the present disclosure, the above objectives may be achieved without changing existing signaling but only with constraints, or with minor changes to the existing signaling.

3. CONFIGURATION EXAMPLES OF USER EQUIPMENT

Figure 9:
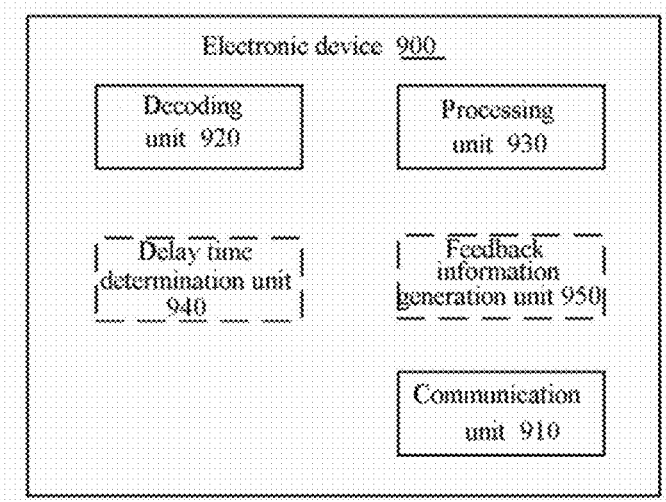
FIG. 9 is a block diagram showing a configuration example of an electronic device as a user equipment according to an embodiment of the present disclosure.

FIG. 9 is a structural block diagram of an electronic device 900 as a user equipment in a wireless communication system according to an embodiment of the present disclosure.

As shown in FIG. 9, the electronic device 900 may include a communication unit 910, a decoding unit 920, and a processing unit 930.

Here, each unit of the electronic device 900 may be included in a processing circuit. It should be noted that, the electronic device 900 may include one or more processing circuits. Further, the processing circuit may include various discrete functional units for performing various functions and/or operations. It should be noted that these functional units may be physical entities or logical entities, and units with different names may be implemented by a same physical entity.

According to an embodiment of the present disclosure, the electronic device 900 may receive the first downlink control signaling through the communication unit 910. Here, the electronic device 900 may receive the first downlink control signaling from a network side device, such as a base station device.

According to an embodiment of the present disclosure, the decoding unit 920 is configured to decode downlink data information or downlink control information from the network side device. For example, the decoding unit 920 may decode the first downlink control signaling to acquire first frequency domain indication information and first beam indication information included in the first downlink control signaling.

According to an embodiment of the present disclosure, the processing unit 930 may determine a frequency domain resource and a beam for receiving information and a frequency domain resource and a beam for transmitting information, including a downlink receiving beam and a downlink frequency domain resource for receiving downlink control information, a downlink receiving beam and a downlink frequency domain resource for receiving downlink data information, an uplink transmission beam and an uplink frequency domain resource for transmitting uplink control information, and an uplink transmission beam and an uplink frequency domain resource for transmitting uplink data information.

According to an embodiment of the present disclosure, after the decoding unit 920 acquires the first beam indication information and the first frequency domain indication information, the electronic device 900 may determine whether a frequency domain resource indicated by the first frequency domain indication information is the same as a frequency domain resource corresponding to a beam indicated by the first beam indication information. Further, in a case that the frequency domain resource indicated by the first frequency domain indication information is the same as the frequency domain resource corresponding to the beam indicated by the first beam indication information, the processing unit 930 may determine that the frequency domain resource is a frequency domain resource for receiving downlink information or transmitting uplink information, so that the electronic device 900 can receive downlink information or transmit uplink information on the frequency domain resource according to the beam indicated by the first beam indication information through the communication unit 910.

According to an embodiment of the present disclosure, the electronic device 900 may acquire a binding relationship between a downlink transmission beam and a downlink frequency domain resource and a binding relationship between an uplink transmission beam and an uplink frequency domain resource from the network side device, for example, through the RRC signaling, so that the frequency domain resource corresponding to the beam indicated by the first beam indication information may be determined according to the binding relationship.

According to an embodiment of the present disclosure, in a case that the electronic device 900 determines that the frequency domain resource indicated by the first frequency domain indication information is different from the frequency domain resource corresponding to the beam indicated by the first beam indication information, the processing unit 930 may determine the frequency domain resource corresponding to the beam indicated by the first beam indication information as the frequency domain resource for receiving downlink information or transmitting uplink information, so that the electronic device 900 can receive downlink information or transmit uplink information on the frequency domain resource corresponding to the beam indicated by the first beam indication information according to the beam indicated by the first beam indication information. That is to say, the electronic device 900 may ignore the frequency domain resource indicated by the first frequency domain indication information, and adopt the frequency domain resource corresponding to the beam indicated by the first beam indication information.

As described above, according to the embodiment of the present disclosure, the electronic device 900 may determine whether the frequency domain resource indicated by the first frequency domain indication information is the same as the frequency domain resource corresponding to the beam indicated by the first beam indication information, so that a frequency domain resource and a beam can be correctly indicated in a case that the frequency domain resource is bound to the beam.

According to an embodiment of the present disclosure, the first downlink control signaling may be DCI. Embodiments of the disclosure are described below for DCI for downlink scheduling and DCI for uplink scheduling.

In a case that the DCI is the DCI for downlink scheduling, and the frequency domain resource indicated by the first frequency domain indication information is the same as the frequency domain resource corresponding to the beam indicated by the first beam indication information, the processing unit 930 may determine that the downlink frequency domain resource of downlink control information and the downlink frequency domain resource of downlink data information are the same as each other, and determine that the downlink transmission beam of the downlink data information is the beam indicated by the first beam indication information. Further, the processing unit 930 may determine that the downlink transmission beam of the downlink control information is the same as the downlink transmission beam of the downlink data information, so as to determine that a downlink receiving beam of the downlink control information is the same as a downlink receiving beam of the downlink data information. Further, the electronic device 900 may receive the downlink control information on the downlink frequency domain resource of the downlink control information by using the downlink receiving beam of the downlink control information, and may receive the downlink data information on the downlink frequency domain resource of the downlink data information by using the downlink receiving beam of the downlink data information. That is, the electronic device 900 may determine the downlink transmission beam of the downlink control information according to an implicit indication of the network side device.

According to an embodiment of the present disclosure, in a case that the frequency domain resource indicated by the first frequency domain indication information is the same as the frequency domain resource corresponding to the beam indicated by the first beam indication information, the processing unit 930 may also determine that the downlink frequency domain resource of the downlink control information and the downlink frequency domain resource of the downlink data information are the same as each other, and determine that the downlink transmission beam of the downlink data information is the beam indicated by the first beam indication information. Further, the processing unit 930 may determine a downlink receiving beam according to the downlink transmission beam of the downlink data information, and receive the downlink data information on the downlink frequency domain resource of the downlink data information according to the downlink receiving beam of the downlink data information. Further, the decoding unit 920 may decode the downlink data information to determine beam indication information for indicating the downlink transmission beam of the downlink control information. Here, the electronic device 900 may determine whether the downlink transmission beam of the downlink control information is the same as the beam indicated by the first beam indication information. Further, in a case that the downlink transmission beam of the downlink control information is the same as the beam indicated by the first beam indication information, the processing unit 930 may determine that the downlink transmission beam of the downlink control information is the downlink transmission beam. Further, the electronic device 900 may determine the downlink receiving beam according to the downlink transmission beam of the downlink control information, and receive the downlink control information on the downlink frequency domain resource of the downlink control information by using the downlink receiving beam. That is, the electronic device 900 may determine the downlink transmission beam of the downlink control information according to an explicit indication of the network side device.

According to an embodiment of the present disclosure, in a case that the beam indicated by the first beam indication information is represented by using a reference signal identification and the beam of the downlink control information is indicated by using a reference signal identification, the electronic device 900 may determine whether the downlink transmission beam of the downlink control information is the same as the beam indicated by the first beam indication information as follows. Specifically, in a case that a reference signal included in the first beam indication information is the same as, or has a quasi co-location relationship with a reference signal included in the beam indication information for indicating the downlink transmission beam of the downlink control information, the electronic device 900 may determine that the downlink transmission beam of the downlink control information is the same as the beam indicated by the first beam indication information.

As shown in FIG. 9, the electronic device 900 may further include a delay time determination unit 940. The delay time determination unit 940 is configured to determine a delay time period when the downlink frequency domain resource and the downlink transmission beam change. According to an embodiment of the present disclosure, in a case that a downlink frequency domain resource indicated by a downlink control signaling from the network side device is different from the previous downlink frequency domain resource, it may be considered that the downlink frequency domain resource changes. Similarly, in a case that a downlink transmission beam indicated by the downlink control signaling from the network side device is different from the previous downlink transmission beam, it may be considered that the downlink transmission beam changes.

In a case that the electronic device 900 determines the downlink transmission beam of the downlink control information according to the implicit indication of the network side device, when the downlink frequency domain resource and the downlink transmission beam change, the delay time determination unit 940 may determine the delay time period according to at least one of a delay of frequency domain resource switching and a delay of beam switching. Further, the delay time determination unit 940 may determine a maximum of the delay of the frequency domain resource switching and the delay of the beam switching as the delay time period.

According to an embodiment of the present disclosure, the electronic device 900 switches the downlink frequency domain resource and the downlink transmission beam within the delay time period when the first downlink control signaling is received. Here, switching the downlink frequency domain resource is that the processing unit 930 of the electronic device 900 switches a downlink frequency domain resource for receiving downlink information from a current downlink frequency domain resource to a new downlink frequency domain resource. The switching the downlink transmission beam is that the processing unit 930 of the electronic device 900 determines a new downlink transmission beam for transmitting downlink information, and determines a new downlink receiving beam according to the new downlink transmission beam.

Here, the delay of the frequency domain resource switching may be a BWP gap, a BWP switch delay or other parameters, and the delay of the beam switching may be a TCI gap, timeDurationForQCL or other parameters.

According to an embodiment of the present disclosure, in a case that the electronic device 900 determines the downlink transmission beam of the downlink control information according to the explicit indication of the network side device, and the electronic device 900 is not required to feed back with respect to the downlink data information, the delay time determination unit 940 may determine the delay time period according to at least one of the delay of the frequency domain resource switching and the delay of the beam switching. Further, the delay time determination unit 940 may determine the maximum of the delay of the frequency domain resource switching and the delay of the beam switching as the delay time period.

According to an embodiment of the present disclosure, the electronic device 900 switches the downlink frequency domain resource and the downlink transmission beam within the delay time period when the beam indication information for indicating the downlink transmission beam of the downlink control information is received.

According to the embodiment of the present disclosure, as shown in FIG. 9, the electronic device 900 may further include a feedback information generation unit 950. The feedback information generation unit 950 is configured to generate feedback information for the downlink data information, and the feedback information includes ACK and NACK.

According to an embodiment of the present disclosure, in a case that the electronic device 900 determines the downlink transmission beam of the downlink control information according to the explicit indication by the network side device, and the electronic device 900 is required to feed back with respect to the downlink data information, the delay time determination unit 940 may determine the delay time period according to at least one of the delay of the frequency domain resource switching, the delay of the beam switching, a time period for processing the downlink data information, and a transmission delay of feedback information. Further, the delay time determination unit 940 may determine a maximum of the delay of the frequency domain resource switching, the delay of the beam switching, the time period for processing the downlink data information, and the transmission delay of the feedback information as the delay time period.

According to an embodiment of the present disclosure, the electronic device 900 may transmit feedback information to the network side device through the communication unit 910, and the downlink frequency domain resource and the downlink transmission beam is switched within the delay time period when the feedback information is transmitted.

In the art, the downlink frequency domain resource and the downlink transmission beam are respectively switched. In other words, the downlink frequency domain resource is switched within the delay of the frequency domain resource switching, and the downlink transmission beam is switched within the delay of the beam switching. According to the embodiment of the present disclosure, a switching timing sequence of frequency domain resources and beams is improved in a case that the frequency domain resources are bound to the beams.

In a case that the DCI is used for uplink scheduling, and the frequency domain resource indicated by the first frequency domain indication information is the same as the frequency domain resource corresponding to the beam indicated by the first beam indication information, the processing unit 930 may determine that the uplink frequency domain resource of uplink control information and the uplink frequency domain resource of uplink data information are the same as each other, and determine that the uplink transmission beam of the uplink data information is the beam indicated by the first beam indication information. Further, the processing unit 930 may determine that an uplink transmission beam of the uplink control information is the same as the uplink transmission beam of the uplink data information. Further, the electronic device 900 may transmit the uplink control information on an uplink frequency domain resource of the uplink control information by using the uplink transmission beam of the uplink control information, and transmit the uplink data information on the uplink frequency domain resource of the uplink data information by using the uplink transmission beam of the uplink data information. That is, the electronic device 900 may determine the uplink transmission beam of the uplink control information according to the implicit indication of the network side device.

According to an embodiment of the present disclosure, the delay time determination unit 940 may further configured to determine a delay time period when the uplink frequency domain resource and the uplink transmission beam change. According to an embodiment of the present disclosure, in a case that an uplink frequency domain resource indicated by the downlink control signaling from the network side device is different from the previous uplink frequency domain resource, it may be considered that the uplink frequency domain resource changes. Similarly, in a case that an uplink transmission beam indicated by the downlink control signaling from the network side device is different from the previous uplink transmission beam, it may be considered that the uplink transmission beam changes.

When the uplink frequency domain resource and the uplink transmission beam change, the delay time determination unit 940 may determine the delay time period according to at least one of the delay of the frequency domain resource switching and the delay of the beam switching. Further, the delay time determination unit 940 may determine a maximum of the delay of the frequency domain resource switching and the delay of the beam switching as the delay time period.

According to an embodiment of the present disclosure, the electronic device 900 switches the uplink frequency domain resource and the uplink transmission beam within the delay time period when the first downlink control signaling is received. Here, switching the uplink frequency domain resource is that the processing unit 930 of the electronic device 900 switches an uplink frequency domain resources for transmitting uplink information from a current uplink frequency domain resource to a new uplink frequency domain resource, and switching the uplink transmission beam is that the processing unit 930 of the electronic device 900 switches an uplink transmission beam for transmitting uplink information from a current uplink transmission beam to a new uplink transmission beam.

In the art, the uplink frequency domain resource and the uplink transmission beam are respectively switched. In other words, the uplink frequency domain resource is switched within the delay of the frequency domain resource switching, and the uplink transmission beam is switched within the delay of the beam switching. According to the embodiment of the present disclosure, a switching timing sequence of frequency domain resources and beams is improved in a case that the frequency domain resources are bound to the beams.

The first downlink control signaling according to the embodiment of the present disclosure is described in detail above.

According to an embodiment of the present disclosure, the electronic device 900 may receive a second downlink control signaling through the communication unit 910. The second downlink control signaling may include second beam indication information, which is used to indicate a beam of downlink control information or to indicate a beam of uplink control information.

According to an embodiment of the present disclosure, the second downlink control signaling may be MAC CE. Embodiments according to the present disclosure are described below respectively for MAC CE for uplink activation and MAC CE for downlink activation.

In a case that MAC CE is a MAC CE for downlink activation, the MAC CE may include the second beam indication information, which is used to indicate the downlink transmission beam of the downlink control information.

According to the embodiment of the present disclosure, the processing unit 930 may determine the downlink transmission beam of the downlink control information according to MAC CE, and determine a downlink frequency domain resource corresponding to the downlink transmission beam as a downlink frequency domain resource of the downlink control information. Further, the processing unit 930 may determine the downlink transmission beam of the downlink data information as being the same as the downlink transmission beam of the downlink control information, and determine that the downlink frequency domain resource of the downlink data information as being the same as the downlink frequency domain resource of the downlink control information. Further, the processing unit 930 may determine a downlink receiving beam according to the downlink transmission beam, and the electronic device 900 receives the downlink control information and the downlink data information on the downlink frequency domain resource corresponding to the downlink transmission beam of the downlink control information according to the downlink receiving beam.

In a case that the MAC CE is a MAC CE for uplink activation, the MAC CE may include second beam indication information, which is used to indicate the uplink transmission beam of the uplink control information.

According to an embodiment of the present disclosure, the processing unit 930 may determine the uplink transmission beam of the uplink control information according to the MAC CE, and determine an uplink frequency domain resource corresponding to the uplink transmission beam as the uplink frequency domain resource of the uplink control information. Further, the processing unit 930 may determine the uplink transmission beam of the uplink data information as being the same as the uplink transmission beam of the uplink control information, and determine that the uplink frequency domain resource of the uplink data information is the same as the uplink frequency domain resource of the uplink control information. Further, the electronic device 900 may transmit the uplink control information and the uplink data information on the uplink frequency domain resource corresponding to the uplink transmission beam of the uplink control information according to the uplink transmission beam.

The second downlink control signaling according to the embodiment of the present disclosure is described in detail above.

According to an embodiment of the present disclosure, the electronic device 900 may receive a third downlink control signaling through the communication unit 910. The third downlink control signaling includes third frequency domain indication information and third beam indication information. The third frequency domain indication information is used to indicate frequency domain resources of downlink control information and downlink data information, or used to indicate frequency domain resources of uplink control information and uplink data information. The third beam indication information is used to indicate beams of the downlink control information and the downlink data information, or used to indicate beams of the uplink control information and the uplink data information.

According to an embodiment of the present disclosure, the third downlink control signaling may be RRC signaling. Embodiments according to the present disclosure are described below for an RRC signaling for downlink configuration and an RRC signaling for uplink configuration.

In a case that the RRC signaling is the RRC signaling for downlink configuration, the RRC signaling may include third frequency domain indication information and third beam indication information for each serving cell. The third frequency domain indication information is used to indicate default downlink frequency domain resources of downlink control information and downlink data information set for the serving cell. The third beam indication information is used to indicate default downlink transmission beams of downlink control information and downlink data information set for the serving cell.

According to an embodiment of the present disclosure, the electronic device 900 may determine a current serving cell, determine a downlink receiving beam according to default downlink transmission beams set for the current serving cell, and then receive the downlink control information and the downlink data information on the default downlink frequency domain resources set for the current serving cell according to the downlink receiving beam.

In a case that the RRC signaling is the RRC signaling for uplink configuration, the RRC signaling may include third frequency domain indication information and third beam indication information for each serving cell. The third frequency domain indication information is used to indicate default uplink frequency domain resources of the uplink control information and the uplink data information set for the serving cell. The third beam indication information is used to indicate default uplink transmission beams of the uplink control information and the uplink data information set for the serving cell.

According to an embodiment of the present disclosure, the electronic device 900 may determine a current serving cell, and transmit uplink the control information and the uplink data information on the default uplink frequency domain resources set for the current serving cell by using the default uplink transmission beam set for the current serving cell.

The third downlink control signaling according to the embodiment of the present disclosure is described in detail above.

It can be seen that according to the embodiment of the present disclosure, a frequency domain resource and a beam can be correctly indicated in a case that the frequency domain resource is bound to the beam, and a frequency domain resource and a beam of data information may be ensured to be the same as a frequency domain resource and a beam of control information, respectively. In addition, according to the embodiment of the present disclosure, the above objectives may be achieved without changing existing signaling but only with constraints, or with minor changes to the existing signaling.

4. METHOD EMBODIMENTS

A wireless communication method performed by the electronic device 300 as a network side device in a wireless communication system according to an embodiment of the present disclosure is described in detail below.

Figure 10:
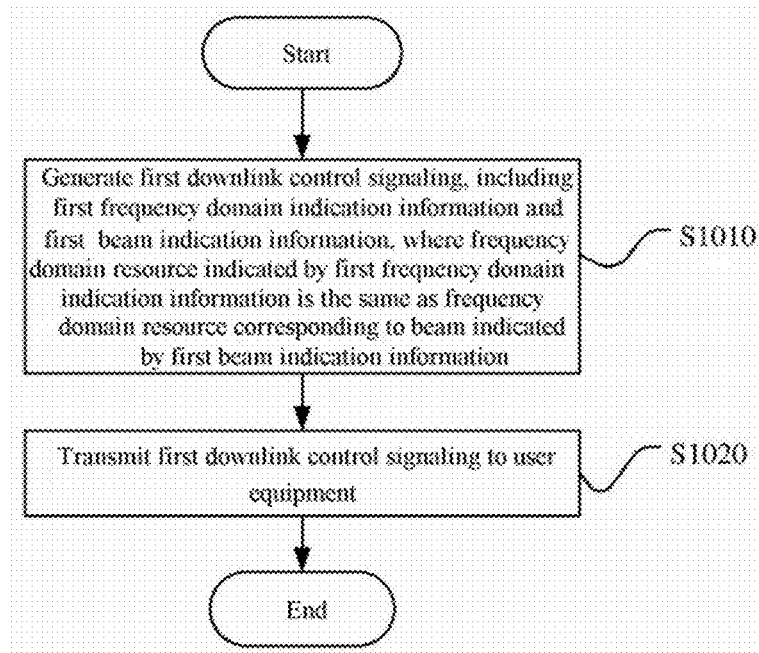
FIG. 10 is a flow chart showing a wireless communication method performed by an electronic device as a network side device according to an embodiment of the present disclosure.

FIG. 10 is a flow chart showing a wireless communication method performed by the electronic device 300 as the network side device in the wireless communication system according to an embodiment of the present disclosure.

As shown in FIG. 10, in step S1010, a first downlink control signaling is generated, where the first downlink control signaling includes first frequency domain indication information and first beam indication information, and a frequency domain resource indicated by the first frequency domain indication information is the same as a frequency domain resource corresponding to a beam indicated by the first beam indication information.

Next, in step S1020, the first downlink control signaling is transmitted to the user equipment.

Preferably, the wireless communication method further includes: transmitting downlink data information and downlink control information on the frequency domain resource according to the beam, or receiving uplink data information and uplink control information on the frequency domain resource according to the beam.

Preferably, the wireless communication method further includes: generating downlink data information. The downlink data information includes beam indication information for indicating a beam of the downlink control information, and the beam of the downlink control information is the same as the beam indicated by the first beam indication information.

Preferably, the wireless communication method further includes: using a reference signal identification to represent the beam indicated by the first beam indication information, and using a reference signal identification to indicate the beam of the downlink control information. A reference signal included in the first beam indication information is the same as or has a quasi co-location relationship with a reference signal included in the beam indication information for indicating the beam of the downlink control information.

Preferably, the first downlink control signaling includes DCI.

Preferably, the wireless communication method further includes: setting at least a part of fields other than the first frequency domain indication information and the first beam indication information as a specific value, in the absence of uplink information and/or downlink information to be scheduled.

Preferably, the wireless communication method further includes: generating a second downlink control signaling, where the second downlink control signaling includes second beam indication information, and the second beam indication information is used to indicate a beam of downlink control information or used to indicate a beam of uplink control information; and transmitting the second downlink control signaling to the user equipment.

Preferably, the wireless communication method further includes: transmitting downlink control information and downlink data information on a frequency domain resource corresponding to the beam of the downlink control information according to the beam of the downlink control information, or receiving uplink control information and uplink data information on a frequency domain resource corresponding to the beam of the uplink control information according to the beam of the uplink control information.

Preferably, the second downlink control signaling includes MAC CE.

Preferably, the wireless communication method further includes: generating a third downlink control signaling, where the third downlink control signaling includes third frequency domain indication information and third beam indication information, the third frequency domain indication information is used to indicate frequency domain resources of downlink control information and downlink data information, or used to indicate frequency domain resources of uplink control information and uplink data information, and the third beam indication information is used to indicate beams of downlink control information and downlink data information, or used to indicate beams of uplink control information and uplink data information; and transmitting the third downlink control signaling to the user equipment.

Preferably, the wireless communication method further includes: transmitting the downlink control information and the downlink data information on the frequency domain resources of the downlink control information and the downlink data information according to the beams of the downlink control information and the downlink data information, or receiving the uplink control information and the uplink data information on the frequency domain resources of the uplink control information and the uplink data information according to the beams of the uplink control information and the uplink data information.

Preferably, the third downlink control signaling includes RRC.

According to an embodiment of the present disclosure, the above method may be performed by the electronic device 300 according to the embodiments of the present disclosure, and thus all the embodiments of the electronic device 300 described above are applicable to the method.

Next, a wireless communication method performed by the electronic device 900 as a user equipment in a wireless communication system according to an embodiment of the present disclosure is described in detail.

Figure 11:
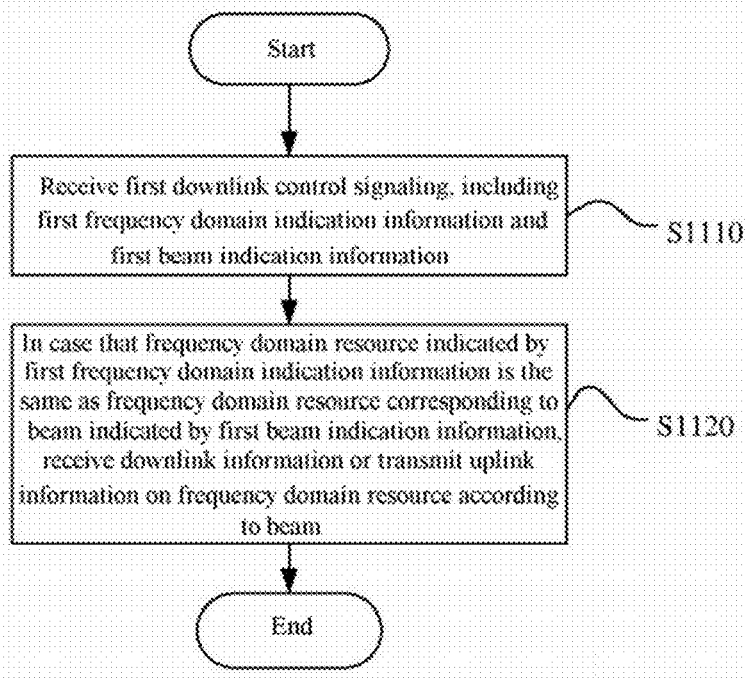
FIG. 11 is a flow chart showing a wireless communication method performed by an electronic device as a user equipment according to an embodiment of the present disclosure.

FIG. 11 is a flow chart showing a wireless communication method performed by the electronic device 900 as the user equipment in the wireless communication system according to an embodiment of the present disclosure.

As shown in FIG. 11, in step S1110, a first downlink control signaling is received, and the first downlink control signaling includes first frequency domain indication information and first beam indication information.

Next, in step S1120, in a case that a frequency domain resource indicated by the first frequency domain indication information is the same as a frequency domain resource corresponding to a beam indicated by the first beam indication information, downlink information is received or uplink information is transmitted on the frequency domain resource according to the beam.

Preferably, the wireless communication method further includes: in a case that the frequency domain resource indicated by the first frequency domain indication information is different from the frequency domain resource corresponding to the beam indicated by the first beam indication information, receiving downlink information or transmitting uplink information on the frequency domain resource corresponding to the beam indicated by the first beam indication information according to the beam.

Preferably, the downlink information includes downlink control information and downlink data information, and the uplink information includes uplink control information and uplink data information.

Preferably, the wireless communication method further includes: determining a delay time period according to at least one of a delay of frequency domain resource switching and a delay of beam switching, when the frequency domain resource and the beam change; and switching the frequency domain resource and the beam within the delay time period when the first downlink control signaling is received.

Preferably, the wireless communication method further includes: receiving downlink data information on the frequency domain resource according to the beam, where the downlink data information includes beam indication information for indicating a beam of the downlink control information; and receiving downlink control information on the frequency domain resource according to the beam of the downlink control information, in a case that the beam of the downlink control information is the same as the beam indicated by the first beam indication information.

Preferably, the beam indicated by the first beam indication information is represented by use of a reference signal identification, and the beam of the downlink control information is indicated by use of a reference signal identification. The wireless communication method further includes: determining that the beam of the downlink control information is the same as the beam indicated by the first beam indication information, in a case that a reference signal comprised in the first beam indication information is the same as or has a quasi co-location relationship with a reference signal comprised in the beam indication information for indicating the beam of the downlink control information.

Preferably, the wireless communication method further includes: determining a delay time period according to at least one of a delay of frequency domain resource switching and a delay of beam switching, when the frequency domain resource and the beam change; and switching the frequency domain resource and the beam within the delay time period when the beam indication information for indicating the beam of the downlink control information is received.

Preferably, the wireless communication method further includes: generating feedback information for the downlink data information; determining a delay time period according to at least one of a delay of frequency domain resource switching, a delay of beam switching, a time period for processing the downlink data information, and a transmission delay of the feedback information, when the frequency domain resource and the beam change; and switching the frequency domain resource and the beam within the delay time period when the feedback information is transmitted.

Preferably, the first downlink control signaling includes DCI.

Preferably, the wireless communication method further includes: receiving a second downlink control signaling, where the second downlink control signaling includes second beam indication information, and the second beam indication information is used to indicate a beam of downlink control information or to indicate a beam of uplink control information; and receiving downlink control information and downlink data information on a frequency domain resource corresponding to the beam of the downlink control information according to the beam of the downlink control information, or transmit uplink control information and uplink data information on a frequency domain resource corresponding to the beam of the uplink control information according to the beam of the uplink control information.

Preferably, the second downlink control signaling includes MAC CE.

Preferably, the wireless communication method further includes: receiving a third downlink control signaling, where the third downlink control signaling includes third frequency domain indication information and third beam indication information; the third frequency domain indication information is used to indicate frequency domain resources of downlink control information and downlink data information, or used to indicate frequency domain resources of uplink control information and uplink data information; and the third beam indication information is used to indicate beams of the downlink control information and the downlink data information, or used to indicate beams of the uplink control information and the uplink data information; and receiving the downlink control information and the downlink data information on the frequency domain resources of downlink control information and downlink data information according to the beams of downlink control information and downlink data information, or transmitting the uplink control information and the uplink data information on the frequency domain resources of uplink control information and uplink data information according to the beams of uplink control information and uplink data information.

Preferably, the third downlink control signaling includes RRC.

According to an embodiment of the present disclosure, the above method may be performed by the electronic device 900 according to the embodiments of the present disclosure, and thus all the embodiments of the electronic device 900 described above are applicable to the method.

5. APPLICATION EXAMPLES

The technology of the present disclosure is applicable to various products.

For example, the network side device may be implemented as any type of base station device, such as a macro eNB and a small eNB, and may be implemented as any type of gNB (a base station in a 5G system). The small eNB may be an eNB covering a cell smaller than a macro cell, such as a pico eNB, a micro eNB, or a home (femto) eNB. Alternatively, the base station may be implemented as any other type of base station, such as a NodeB and a base transceiver station (BTS). The base station may include a body (which is also referred to as a base station device) configured to control wireless communication and one or more remote radio heads (RRHs) that are arranged in a different place from the body.

The user equipment may be implemented as a mobile terminal (such as a smartphone, a tablet personal computer (PC), a notebook PC, a portable game terminal, a portable/dongle-type mobile router, and a digital camera), or an in-vehicle terminal (such as a car navigation device). The user equipment may also be implemented as a terminal that performs machine-to-machine (M2M) communication (which is also referred to as a machine type communication (MTC) terminal). In addition, the user equipment may be a wireless communication module (such as an integrated circuit module including a single wafer) installed on each of the user equipment described above.

Application Examples on Base Station

First Application Example

Figure 12:
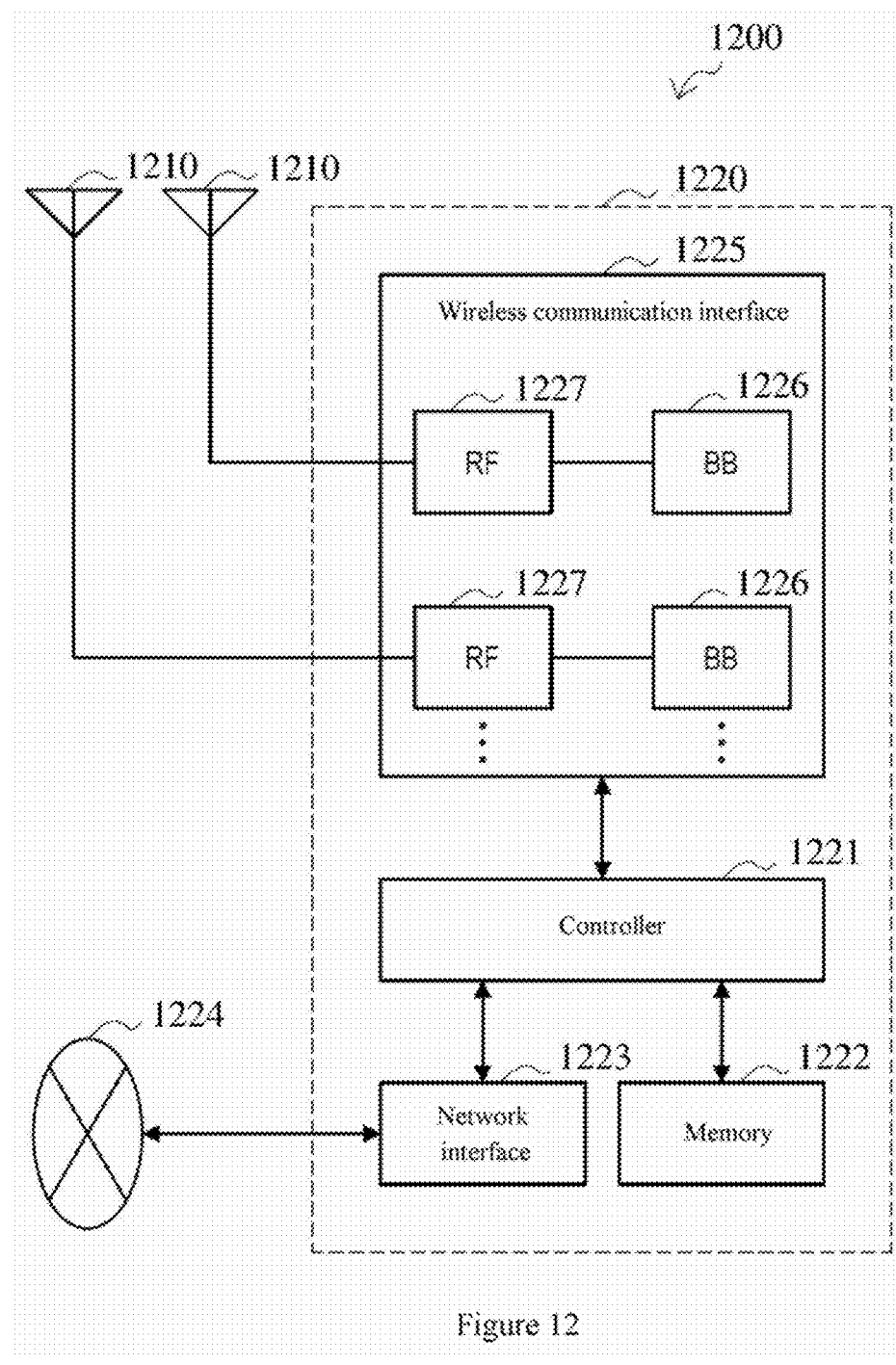
FIG. 12 is a block diagram showing a first schematic configuration example of an evolved node B (eNB)

FIG. 12 is a block diagram showing a first example of a schematic configuration of an eNB to which the technology of the present disclosure may be applied. The eNB 1200 includes a single or multiple antennas 1210 and a base station device 1220. The base station device 1220 and each of the antennas 1210 may be connected to each other via an RF cable.

Each of the antennas 1210 includes a single or multiple antenna elements (such as multiple antenna elements included in a multiple-input multiple-output (MIMO) antenna), and is used for the base station device 1220 to transmit and receive wireless signals. The eNB 1200 may include multiple antennas 1210, as shown in FIG. 12. For example, the multiple antennas 1210 may be compatible with multiple frequency bands used by the eNB 1200. Although FIG. 12 shows an example in which the eNB 1200 includes multiple antennas 1210, the eNB 1200 may include a single antenna 1210.

The base station device 1220 includes a controller 1221, a memory 1222, a network interface 1223, and a wireless communication interface 1225.

The controller 1221 may be, for example, a CPU or a DSP, and operates various functions of a higher layer of the base station device 1220. For example, the controller 1221 generates a data packet based on data in a signal processed by the wireless communication interface 1225, and transfers the generated packet via the network interface 1223. The controller 1221 may bundle data from multiple baseband processors to generate a bundled packet, and transfer the generated bundled packet. The controller 1221 may have logical functions of performing control such as radio resource control, radio bearer control, mobility management, admission control, and scheduling. The control may be performed in conjunction with an eNB or a core network node in the vicinity. The memory 1222 includes an RAM and an ROM, and stores a program executed by the controller 1221, and various types of control data (such as a terminal list, transmission power data, and scheduling data).

The network interface 1223 is a communication interface for connecting the base station device 1220 to a core network 1224. The controller 1221 may communicate with a core network node or another eNB via the network interface 1223. In this case, the eNB 1200, and the core network node or the other eNB may be connected to each other through a logical interface (such as an Si interface and an X2 interface). The network interface 1223 may also be a wired communication interface or a wireless communication interface for a wireless backhaul line. In a case that the network interface 1223 is a wireless communication interface, the network interface 1223 may use a higher frequency band for wireless communication than a frequency band used by the wireless communication interface 1225.

The wireless communication interface 1225 supports any cellular communication scheme (such as Long Term Evolution (LTE) and LTE-Advanced), and provides wireless connection to a terminal positioned in a cell of the eNB 1200 via the antenna 1210. The wireless communication interface 1225 may typically include, for example, a baseband (BB) processor 1226 and a RF circuit 1227. The BB processor 1226 may perform, for example, encoding/decoding, modulating/demodulating and multiplexing/de-multiplexing, and perform various types of signal processes of layers (for example, L1, media access control (MAC), radio link control (RLC) and packet data convergence protocol (PDCP)). Instead of the controller 1221, the BB processor 1226 may have a part or all of the above logical functions. The BB processor 1226 may be a memory storing a communication control program, or a module including a processor and a related circuit configured to execute the program. Updating the program may change the functions of the BB processor 1226. The module may be a card or a blade inserted into a slot of the base station device 1220. Alternatively, the module may also be a chip mounted on the card or the blade. In addition, the RF circuit 1227 may include, for example, a mixer, a filter and an amplifier, and transmit and receive wireless signals via the antenna 1210.

As shown in FIG. 12, the wireless communication interface 1225 may include multiple BB processors 1226. For example, the multiple BB processors 1226 may be compatible with multiple frequency bands used by the eNB 1200. As shown in FIG. 12, the wireless communication interface 1225 may include multiple RF circuits 1227. For example, the multiple RF circuits 1227 may be compatible with multiple antenna elements. Although FIG. 12 shows an example in which the wireless communication interface 1225 includes multiple BB processors 1226 and multiple RF circuits 1227, the wireless communication interface 1225 may include a single BB processor 1226 or a single RF circuit 1227.

Second Application Example

Figure 13:
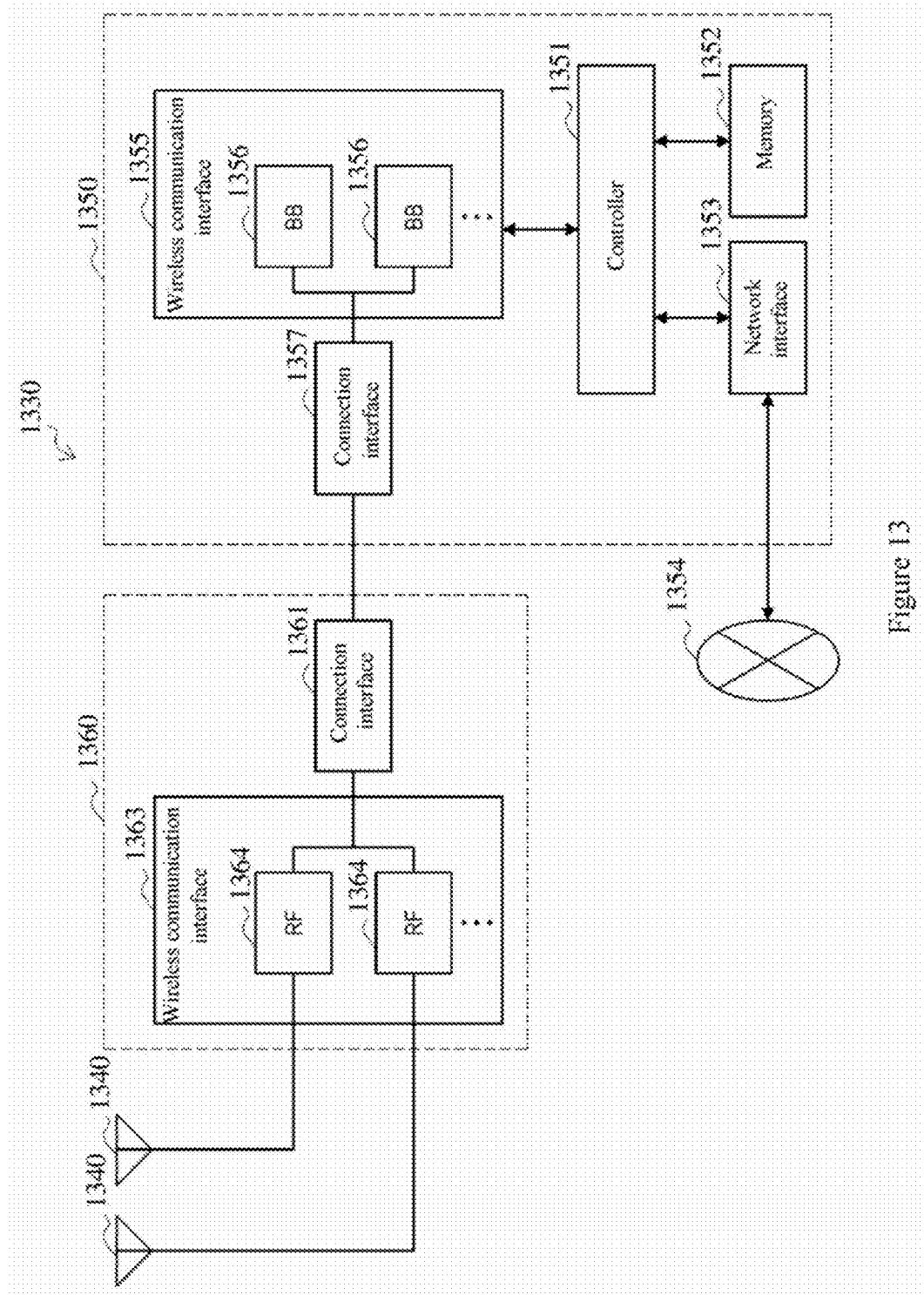
FIG. 13 is a block diagram showing a second schematic configuration example of an eNB.

FIG. 13 is a block diagram showing a second example of a schematic configuration of an eNB to which the technology of the present disclosure may be applied. The eNB 1330 includes a single or multiple antennas 1340, a base station device 1350 and an RRH 1360. The RRH 1360 and each antenna 1340 may be connected to each other via an RF cable. The base station device 1350 and the RRH 1360 may be connected to each other via a high-speed line such as an optical fiber cable.

Each of the antennas 1340 includes a single or multiple antenna elements (such as multiple antenna elements included in an MIMO antenna), and is used for the RRH 1360 to transmit and receive wireless signals. As shown in FIG. 13, the eNB 1330 may include multiple antennas 1340. For example, the multiple antennas 1340 may be compatible with multiple frequency bands used by the eNB 1330. Although FIG. 13 shows an example in which the eNB 1330 includes multiple antennas 1340, the eNB 1330 may include a single antenna 1340.

The base station device 1350 includes a controller 1351, a memory 1352, a network interface 1353, a wireless communication interface 1355, and a connection interface

1357. The controller 1351, the memory 1352, and the network interface 1353 are the same as the controller 1221, the memory 1222, and the network interface 1223 described with reference to FIG. 12. The network interface 1353 is a communication interface for connecting the base station device 1350 to a core network 1354.

The wireless communication interface 1355 supports any cellular communication scheme (such as LTE and LTE-advanced), and provides wireless communication with a terminal located in a sector corresponding to the RRH 1360 via the RRH 1360 and the antenna 1340. The wireless communication interface 1355 may typically include, for example, a BB processor 1356. The BB processor 1356 is the same as the BB processor 1226 described with reference to FIG. 12, except that the BB processor 1356 is connected to a RF circuit 1364 of the RRH 1360 via the connection interface 1357. As shown in FIG. 13, the wireless communication interface 1355 may include multiple BB processors 1356. For example, the multiple BB processors 1356 may be compatible with multiple frequency bands used by the eNB 1330. Although FIG. 13 shows an example in which the wireless communication interface 1355 includes multiple BB processors 1356, the wireless communication interface 1355 may include a single BB processor 1356.

The connection interface 1357 is an interface for connecting the base station device 1350 (the wireless communication interface 1355) to the RRH 1360. The connection interface 1357 may also be a communication module for communication in the above high-speed line that connects the base station device 1350 (the wireless communication interface 1355) to the RRH 1360.

The RRH 1360 includes a connection interface 1361 and a wireless communication interface 1363.

The connection interface 1361 is an interface for connecting the RRH 1360 (the wireless communication interface 1363) to the base station device 1350. The connection interface 1361 may also be a communication module for communication in the above high-speed line.

The wireless communication interface 1363 transmits and receives wireless signals via the antenna 1340. The wireless communication interface 1363 may typically include, for example, the RF circuit 1364. The RF circuit 1364 may include, for example, a mixer, a filter and an amplifier, and transmit and receive wireless signals via the antenna 1340. The wireless communication interface 1363 may include multiple RF circuits 1364, as shown in FIG. 13. For example, the multiple RF circuits 1364 may support multiple antenna elements. Although FIG. 13 shows an example in which the wireless communication interface 1363 includes multiple RF circuits 1364, the wireless communication interface 1363 may include a single RF circuit 1364.

In the eNB 1200 shown in FIG. 12 and the eNB 1330 shown in FIG. 13, the first generation unit 310, the configuration unit 330, the processing unit 340, the downlink information generation unit 350, the second generation unit 360 and the third generation unit 370 described in connection with FIG. 3 may be implemented by the controller 1221 and/or the controller 1351. At least part of the functions may also be implemented by the controller 1221 and the controller 1351. For example, the controller 1221 and/or the controller 1351 may perform functions of generating a first downlink control signaling, configuring a binding relationship between beams and frequency domain resources, determining beams and frequency domain resources for transmitting downlink information and receiving uplink information, generating downlink information, generating a second downlink control signaling, and generating third downlink control information by executing instructions stored in a corresponding memory.

Application Examples on Terminal Device

First Application Example

Figure 14:
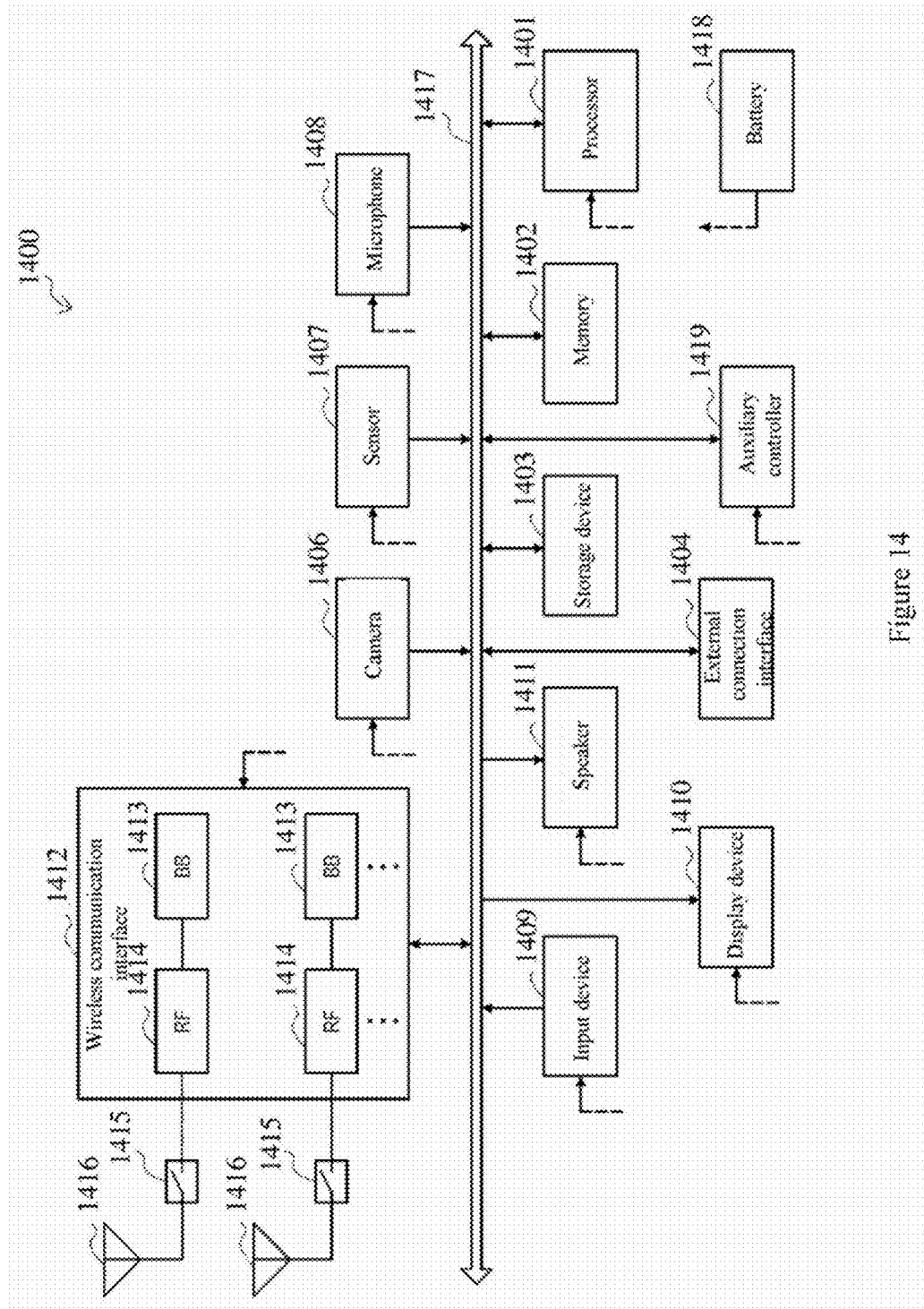
FIG. 14 is a block diagram showing a schematic configuration example of a smart phone.

FIG. 14 is a block diagram showing an example of a schematic configuration of a smartphone 1400 to which the technology of the present disclosure may be applied. The smartphone 1400 includes a processor 1401, a memory 1402, a storage device 1403, an external connection interface 1404, a camera 1406, a sensor 1407, a microphone 1408, an input device 1409, a display device 1410, a speaker 1411, a wireless communication interface 1412, one or more antenna switches 1415, one or more antennas 1416, a bus 1417, a battery 1418 and an auxiliary controller 1419.

The processor 1401 may be, for example, a CPU or a system on chip (SoC), and control functions of an application layer and another layer of the smartphone 1400. The memory 1402 includes an RAM and an ROM, and stores a program that is executed by the processor 1401, and data. The storage device 1403 may include a storage medium such as a semiconductor memory and a hard disk. The external connection interface 1404 is an interface for connecting an external device (such as a memory card and a universal serial bus (USB) device) to the smartphone 1400.

The camera 1406 includes an image sensor (such as a charge coupled device (CCD) and a complementary metal oxide semiconductor (CMOS)) and generates a captured image. The sensor 1407 may include a group of sensors, such as a measurement sensor, a gyroscope sensor, a geomagnetic sensor and an acceleration sensor. The microphone 1408 converts sounds that are inputted to the smartphone 1400 into audio signals. The input device 1409 includes, for example, a touch sensor configured to detect touch on a screen of the display device 1410, a keypad, a keyboard, a button, or a switch, and receives an operation or information inputted from a user. The display device 1410 includes a screen (such as a liquid crystal display (LCD) and an organic light-emitting diode (OLED) display), and displays an output image of the smartphone 1400. The speaker 1411 converts audio signals that are outputted from the smartphone 1400 to sounds.

The wireless communication interface 1412 supports any cellular communication scheme (such as LTE and LTE-Advanced), and performs wireless communication. The wireless communication interface 1412 may typically include, for example, a BB processor 1413 and a RF circuit 1414. The BB processor 1413 may perform, for example, encoding/decoding, modulating/demodulating and multiplexing/de-multiplexing, and perform various types of signal processing for wireless communications. Meanwhile, the RF circuit 1414 may include, for example, a mixer, a filter and an amplifier, and transmit and receive wireless signals via the antenna 1416. The wireless communication interface 1412 may be a chip module on which the BB processor 1413 and the RF circuit 1414 are integrated. As shown in FIG. 14, the wireless communication interface 1412 may include multiple BB processors 1413 and multiple RF circuits 1414. Although FIG. 14 shows an example in which the wireless communication interface 1412 includes multiple BB processors 1413 and multiple RF circuits 1414, the wireless communication interface 1412 may include a single BB processor 1413 or a single RF circuit 1414.

Furthermore, in addition to the cellular communication scheme, the wireless communication interface 1412 may support another type of wireless communication scheme such as a short-distance wireless communication scheme, a near field communication scheme, and a wireless local area network (LAN) scheme. In this case, the wireless communication interface 1412 may include a BB processor 1413 and a RF circuit 1414 for each wireless communication scheme.

Each of the antenna switches 1415 switches a connection destination of the antenna 1416 among multiple circuits (such as circuits for different wireless communication schemes) included in the wireless communication interface 1412.

Each of the antennas 1416 includes a single or multiple antenna elements (such as multiple antenna elements included in an MIMO antenna), and is used for the wireless communication interface 1412 to transmit and receive wireless signals. The smartphone 1400 may include multiple antennas 1416, as shown in FIG. 14. Although FIG. 14 shows an example in which the smartphone 1400 includes multiple antennas 1416, the smartphone 1400 may include a single antenna 1416.

Furthermore, the smartphone 1400 may include an antenna 1416 for each wireless communication scheme. In this case, the antenna switch 1415 may be omitted from the configuration of the smartphone 1400.

The processor 1401, the memory 1402, the storage device 1403, the external connection interface 1404, the camera 1406, the sensor 1407, the microphone 1408, the input device 1409, the display device 1410, the speaker 1411, the wireless communication interface 1412 and the auxiliary controller 1419 are connected to each other via the bus 1417. The battery 1418 supplies power to blocks in the smartphone 1400 shown in FIG. 14 via a feeder line which is indicated partially as a dashed line in FIG. 14. The auxiliary controller 1419 operates a minimum necessary function of the smartphone 1400 in a sleeping mode, for example.

In the smart phone 1400 shown in FIG. 14, the decoding unit 920, the processing unit 930, the delay time determination unit 940, and the feedback information generation unit 950 described in connection with FIG. 9 may be implemented by the processor 1401 or the auxiliary controller 1419. At least part of the functions may also be implemented by the processor 1401 or the auxiliary controller 1419. For example, the processor 1401 or the auxiliary controller 1419 may perform the functions of decoding downlink control signaling, downlink data information and downlink control information, determining beams and frequency domain resources for transmitting uplink information and receiving downlink information, determining a delay time, and generating feedback information by executing instructions stored in the memory 1402 or the storage device 1403.

Second Application Example

Figure 15:
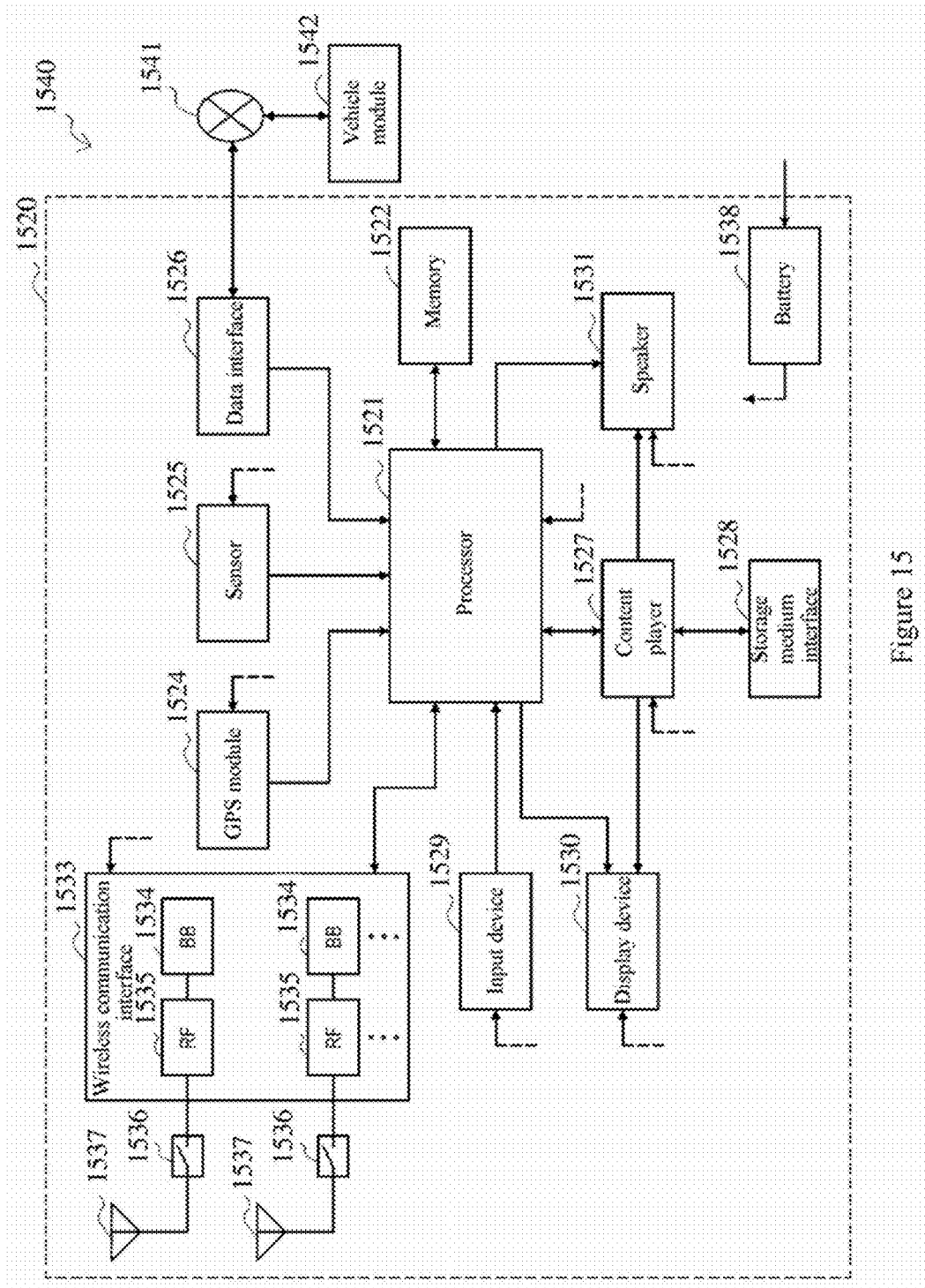
FIG. 15 is a block diagram showing a schematic configuration example of a car navigation device.

FIG. 15 is a block diagram showing an example of a schematic configuration of a car navigation device 1520 to which the technology of the present disclosure may be applied. The car navigation device 1520 includes a processor 1521, a memory 1522, a global positioning system (GPS) module 1524, a sensor 1525, a data interface 1526, a content player 1527, a storage medium interface 1528, an input device 1529, a display device 1530, a speaker 1531, a wireless communication interface 1533, one or more antenna switches 1536, one or more antennas 1537 and a battery 1538.

The processor 1521 may be, for example, a CPU or an SoC, and control a navigation function and another function of the car navigation device 1520. The memory 1522 includes an RAM and an ROM, and stores a program that is executed by the processor 1521, and data.

The GPS module 1524 measures a position (such as latitude, longitude and altitude) of the car navigation device 1520 based on a GPS signal received from a GPS satellite. The sensor 1525 may include a group of sensors such as a gyroscope sensor, a geomagnetic sensor, and an air pressure sensor. The data interface 1526 is connected to, for example, an in-vehicle network 1541 via a terminal not shown, and acquires data generated by the vehicle (such as vehicle speed data).

The content player 1527 reproduces content stored in a storage medium (such as a CD and a DVD) inserted into the storage medium interface 1528. The input device 1529 includes, for example, a touch sensor configured to detect touch on a screen of the display device 1530, a button, or a switch, and receives an operation or information inputted from a user. The display device 1530 includes a screen such as an LCD or an OLED display, and displays an image of the navigation function or content that is reproduced. The speaker 1531 outputs sound of the navigation function or the content that is reproduced.

The wireless communication interface 1533 supports any cellular communication scheme (such as LTE and LTE-Advanced), and performs wireless communications. The wireless communication interface 1533 may typically include, for example, a BB processor 1534 and a RF circuit 1535. The BB processor 1534 may perform, for example, encoding/decoding, modulating/demodulating and multiplexing/de-multiplexing, and perform various types of signal processing for wireless communications. Meanwhile, the RF circuit 1535 may include, for example, a mixer, a filter and an amplifier, and transmit and receive wireless signals via the antenna 1537. The wireless communication interface 1533 may also be a chip module on which the BB processor 1534 and the RF circuit 1535 are integrated. As shown in FIG. 15, the wireless communication interface 1533 may include multiple BB processors 1534 and multiple RF circuits 1535. Although FIG. 15 shows an example in which the wireless communication interface 1533 includes multiple BB processors 1534 and multiple RF circuits 1535, the wireless communication interface 1533 may include a single BB processor 1534 or a single RF circuit 1535.

Furthermore, in addition to the cellular communication scheme, the wireless communication interface 1533 may support another type of wireless communication scheme such as a short-distance wireless communication scheme, a near field communication scheme, and a wireless LAN scheme. In this case, the wireless communication interface 1533 may include a BB processor 1534 and a RF circuit 1535 for each type of wireless communication scheme.

Each of the antenna switches 1536 switches a connection destination of the antenna 1537 among multiple circuits (such as circuits for different wireless communication schemes) included in the wireless communication interface 1533.

Each of the antennas 1537 includes a single or multiple antenna elements (such as multiple antenna elements included in an MIMO antenna), and is used for the wireless communication interface 1533 to transmit and receive wireless signals. The car navigation device 1520 may include multiple antennas 1537, as shown in FIG. 15. Although FIG. 15 shows an example in which the car navigation device 1520 includes multiple antennas 1537, the car navigation device 1520 may include a single antenna 1537.

In addition, the car navigation device 1520 may include an antenna 1537 for each type of wireless communication scheme. In this case, the antenna switch 1536 may be omitted from the configuration of the car navigation device 1520.

The battery 1538 supplies power to blocks in the car navigation device 1520 shown in FIG. 15 via a feeder line which is indicated partially as a dashed line in FIG. 15. The battery 1538 accumulates power supplied from the vehicle.

In the car navigation apparatus 1520 shown in FIG. 15, the decoding unit 920, the processing unit 930, the delay time determination unit 940 and the feedback information generation unit 950 described in connection with FIG. 9 may be implemented by the processor 1521. At least a part of the functions may also be implemented by the processor 1521. For example, the processor 1521 may perform the functions of decoding downlink control signaling, downlink data information, and downlink control information, determining beams and frequency domain resources for transmitting uplink information and receiving downlink information, determining a delay time, and generating feedback information by executing instructions stored in the memory 1522.

The technology of the present disclosure may also be implemented as an in-vehicle system (or a vehicle) 1540 including one or more blocks of the car navigation device 1520, the in-vehicle network 1541 and a vehicle module 1542. The vehicle module 1542 generates vehicle data (such as vehicle speed, engine speed, and fault information), and outputs the generated data to the in-vehicle network 1541.

Preferred embodiments of the present disclosure have been described above with reference to the drawings. However, the present disclosure is not limited to the above examples. Those skilled in the art may make various changes and modifications within the scope of the appended claims, and it should be understood that such changes and modifications naturally fall within the technical scope of the present disclosure.

For example, a unit shown by a dotted line box in the functional block diagram in the drawings indicates that the functional unit is optional in the corresponding device, and the optional functional units may be combined appropriately to achieve desired functions.

For example, multiple functions implemented by one unit in the above embodiments may be implemented by separate devices. Alternatively, multiple functions implemented by respective units in the above embodiments may be implemented by separate devices, respectively. In addition, one of the above functions may be implemented by multiple units. Such configurations are naturally included in the technical scope of the present disclosure.

In the specification, steps described in the flowchart include not only the processes performed chronologically as the described sequence, but also the processes performed in parallel or individually rather than chronologically. Furthermore, the steps performed chronologically may be performed in another sequence appropriately.

Embodiments of the present disclosure are described above in detail in conjunction with the drawings. However, it should be understood that the embodiments described above are intended to illustrate the present disclosure rather than limit the present disclosure. Those skilled in the art may make various modifications and alternations to the above embodiments without departing from the spirit and scope of the present disclosure. Therefore, the scope of the present disclosure is defined by the appended claims and equivalents thereof.

The invention claimed is:

1. An electronic device configured as a base station, comprising a processing circuit configured to:
   communicate with a user equipment (UE) via a plurality of bandwidth parts (BWPs);
   establish a one-to-one relationship between each of the plurality of BWPs and each of a plurality of Channel State Information-Reference Signals (CSI-RSs);
   generate a first downlink control signaling for indicating shared beam information, the shared beam information indicating at least one of:
      downlink data information and downlink control information are to be transmitted on a common downlink beam, or
      uplink data information and uplink control information are to be transmitted on a common uplink beam,
   wherein the shared beam information is indicated by the first downlink control signaling by plural data fields, the plural data fields comprising:
      a first Transmission Configuration Indicator (TCI) state field indicating a first TCI state identifier corresponding to the shared beam information,
      a quasi co-location (QCL) info field comprising:
         a BWP field identifying a BWP of the plurality of BWPs, and
         a reference signal identifier field that identifies the shared beam by identifying a specific CSI-RS of the plurality of CSI-RSs, and
      a quasi co-location (QCL) identifier field indicating a specific QCL type corresponding to beamforming;
   transmit the first downlink control signaling to the UE; and
   in accordance with the first downlink control signaling, perform at least one of:
      downlink data and control communications via the common downlink beam with the UE, or
      uplink data and control communications via the common uplink beam with the UE.

2. An electronic device configured as a use equipment, comprising a processing circuit configured to:
   communicate with a base station (BS) via a plurality of bandwidth parts (BWPs);
   establish a one-to-one relationship between each of the plurality of BWPs and each of a plurality of Channel State Information-Reference Signals (CSI-RSs);
   receive, from the BS, a first downlink control signaling for indicating shared beam information, the shared beam information indicating at least one of:
      downlink data information and downlink control information are to be transmitted on a common downlink beam, or
      uplink data information and uplink control information are to be transmitted on a common uplink beam,
   wherein the shared beam information is indicated by the first downlink control signaling by plural data fields, the plural data fields comprising:
      a first Transmission Configuration Indicator (TCI) state field indicating a first TCI state identifier corresponding to the shared beam information,
      a quasi co-location (QCL) info field comprising:
         a BWP field identifying a BWP of the plurality of BWPs, and
         a reference signal identifier field that identifies the shared beam by identifying a specific CSI-RS of the plurality of CSI-RSs, and a quasi co-location (QCL) identifier field indicating a specific QCL type corresponding to beamforming; and in accordance with the first downlink control signaling, perform at least one of:
- downlink data and control communications via the common downlink beam with the BS, or
- uplink data and control communications via the common uplink beam with the BS.

3. A wireless communication method performed by an electronic device configured as a base station, the method comprising:
- communicating with a user equipment (UE) via a plurality of bandwidth parts (BWPs);
- establishing a one-to-one relationship between each of the plurality of BWPs and each of a plurality of Channel State Information-Reference Signals (CSI-RSs);
- generating a first downlink control signaling for indicating shared beam information, the shared beam information indicating at least one of:
  - downlink data information and downlink control information are to be transmitted on a common downlink beam, or
  - uplink data information and uplink control information are to be transmitted on a common uplink beam, wherein the shared beam information is indicated by the first downlink control signaling by plural data fields, the plural data fields comprising:
- a first Transmission Configuration Indicator (TCI) state field indicating a first TCI state identifier corresponding to the shared beam information,
- a quasi co-location (QCL) info field comprising:
  - a BWP field identifying a BWP of the plurality of BWPs, and
  - a reference signal identifier field that identifies the shared beam by identifying a specific CSI-RS of the plurality of CSI-RSs, and
- a quasi co-location (QCL) identifier field indicating a specific QCL type corresponding to beamforming;

transmitting the first downlink control signaling to the UE; and in accordance with the first downlink control signaling, performing at least one of:
- downlink data and control communications via the common downlink beam with the UE, or
- uplink data and control communications via the common uplink beam with the UE.

* * * * *